US012811141B2

(12) United States Patent
Lee et al.

(10) Patent No.: US 12,811,141 B2
(45) Date of Patent: Nov. 24, 2026

(54) ELECTRODE, LITHIUM BATTERY INCLUDING THE SAME, AND METHOD OF MANUFACTURING THE SAME

(71) Applicant: Samsung SDI Co., Ltd., Yongin-si (KR)

(72) Inventors: Jinhyon Lee, Yongin-si (KR); Ilkyong Kwon, Yongin-si (KR); Junghyun Nam, Yongin-si (KR); Hyun Nam, Yongin-si (KR); Donggeun Lee, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 908 days.

(21) Appl. No.: 17/653,739

(22) Filed: Mar. 7, 2022

(65) Prior Publication Data

US 2022/0285680 A1 Sep. 8, 2022

(30) Foreign Application Priority Data

Mar. 8, 2021 (KR) ........................ 10-2021-0030362

(51) Int. Cl.
*H01M 4/525* (2010.01)
*H01M 4/04* (2006.01)
(Continued)

(52) U.S. Cl.
CPC ........... *H01M 4/525* (2013.01); *H01M 4/043* (2013.01); *H01M 4/505* (2013.01); *H01M 4/623* (2013.01);
(Continued)

(58) Field of Classification Search
CPC ... H01M 4/62–623; H01M 4/13–1399; H01M 4/525; H01M 2004/021; H01M 4/505
See application file for complete search history.

(56) References Cited

U.S. PATENT DOCUMENTS 8,715,860 B2 5/2014 Inoue et al.
9,525,168 B2 12/2016 Mitchell et al.
(Continued)

FOREIGN PATENT DOCUMENTS

CN 102754247 A 10/2012
CN 104508899 A 4/2015
(Continued)

OTHER PUBLICATIONS

Office action dated Aug. 12, 2024 in corresponding KR Patent Application No. 10-2021-0030362, 74pp.
(Continued)

*Primary Examiner* — Allison Bourke
*Assistant Examiner* — Travis L. Martin
(74) *Attorney, Agent, or Firm* — Womble Bond Dickinson (US) LLP

(57) ABSTRACT

Provided are an electrode, a lithium battery including the same, and an electrode manufacturing method, the electrode including: an electrode active material layer including an electrode active material and a binder; an electrode current collector on one surface or between two surfaces of the electrode active material layer; and an interlayer located between the electrode active material layer and the electrode current collector, wherein the electrode active material layer includes: a first electrode active material layer including a first electrode active material and contacting the interlayer; and a second electrode active material layer arranged on the first electrode active material layer and including a second electrode active material layer.

19 Claims, 17 Drawing Sheets

(51) Int. Cl.
*H01M 4/505* (2010.01)
*H01M 4/62* (2006.01)
*H01M 10/0525* (2010.01)

(52) U.S. Cl.
CPC ....... *H01M 4/625* (2013.01); *H01M 10/0525* (2013.01)

(56) References Cited

U.S. PATENT DOCUMENTS

| | | | | |
|---|---|---|---|---|
| 10,141,575 | B2 | 11/2018 | Yamashita et al. | |
| 10,243,196 | B2 | 3/2019 | Saka et al. | |
| 10,741,843 | B2 | 8/2020 | Duong et al. | |
| 11,024,886 | B2 | 6/2021 | Park et al. | |
| 11,038,157 | B2 | 6/2021 | Kim et al. | |
| 11,757,151 | B2 | 9/2023 | Son et al. | |
| 2002/0028380 | A1* | 3/2002 | Tanjo | H01M 10/0568 429/231.1 |
| 2005/0266298 | A1 | 12/2005 | Mitchell et al. | |
| 2007/0009800 | A1* | 1/2007 | Barker | H01M 4/587 429/231.95 |
| 2007/0026312 | A1 | 2/2007 | Imachi et al. | |
| 2008/0020281 | A1 | 1/2008 | Kogetsu et al. | |
| 2011/0168550 | A1 | 7/2011 | Wang et al. | |
| 2015/0037680 | A1 | 2/2015 | Park et al. | |
| 2015/0171478 | A1 | 6/2015 | Suzuki et al. | |
| 2015/0333319 | A1* | 11/2015 | Kawamura | H01M 4/587 252/506 |
| 2016/0049638 | A1 | 2/2016 | Park et al. | |
| 2017/0256776 | A1 | 9/2017 | Saka et al. | |
| 2018/0006291 | A1* | 1/2018 | Kim | H01M 4/13 |
| 2018/0013143 | A1 | 1/2018 | Asakawa et al. | |
| 2018/0212277 | A1 | 7/2018 | Park et al. | |
| 2019/0140254 | A1 | 5/2019 | Kim et al. | |
| 2019/0181424 | A1* | 6/2019 | Hara | H01M 4/13 |
| 2019/0237748 | A1 | 8/2019 | Shin et al. | |
| 2020/0028156 | A1 | 1/2020 | Zhang et al. | |
| 2020/0044257 | A1 | 2/2020 | Koo et al. | |
| 2020/0227723 | A1 | 7/2020 | Wang et al. | |
| 2020/0313191 | A1 | 10/2020 | Wixom et al. | |
| 2020/0365881 | A1 | 11/2020 | Tanaka et al. | |
| 2020/0365897 | A1 | 11/2020 | Badding et al. | |
| 2021/0057719 | A1 | 2/2021 | Song et al. | |
| 2021/0057728 | A1* | 2/2021 | Song | H01M 4/13 |
| 2021/0320288 | A1 | 10/2021 | Althues et al. | |
| 2021/0376309 | A1 | 12/2021 | Son et al. | |
| 2022/0059844 | A1* | 2/2022 | Jang | H01M 4/139 |
| 2022/0109143 | A1 | 4/2022 | Seok et al. | |
| 2022/0209220 | A1* | 6/2022 | Lee | H01M 4/0404 |
| 2022/0271276 | A1* | 8/2022 | Kwon | H01M 10/0525 |
| 2022/0285680 | A1 | 9/2022 | Lee et al. | |
| 2023/0128084 | A1* | 4/2023 | Takayama | H01M 4/364 429/209 |

FOREIGN PATENT DOCUMENTS

| | | | |
|---|---|---|---|
| CN | 106463267 | A | 2/2017 |
| CN | 106663774 | A | 5/2017 |
| CN | 108028413 | A | 5/2018 |
| CN | 109478632 | A | 3/2019 |
| EP | 3300145 | A1 | 3/2018 |
| JP | 2012-169217 | A | 9/2012 |
| JP | 2013-109853 | A | 6/2013 |
| JP | 2014-035888 | A | 2/2014 |
| JP | 2016-106346 | A | 6/2016 |
| JP | 2017-033773 | A | 2/2017 |
| JP | 2017-517862 | A | 6/2017 |
| JP | 2018-049718 | A | 3/2018 |
| JP | 2018-520493 | A | 7/2018 |
| JP | 2020-129485 | A | 8/2020 |
| JP | 2021-34570 | A | 3/2021 |
| JP | 2021-190430 | A | 12/2021 |
| KR | 10-2006-0025230 | A | 3/2006 |
| KR | 10-2006-0134770 | A | 12/2006 |
| KR | 10-2007-0015039 | A | 2/2007 |
| KR | 10-2008-0009654 | A | 1/2008 |
| KR | 10-2015-0029054 | A | 3/2015 |
| KR | 10-2015-0060467 | A | 6/2015 |
| KR | 10-2016-0020649 | A | 2/2016 |
| KR | 10-2017-0099748 | A | 9/2017 |
| KR | 10-2018-0067428 | A | 6/2018 |
| KR | 10-2018-0121411 | A | 11/2018 |
| KR | 10-2019-0124038 | A | 11/2019 |
| KR | 10-2020-0020702 | A | 2/2020 |
| KR | 10-2020-0096153 | A | 8/2020 |
| KR | 10-2021-0021916 | A | 3/2021 |
| WO | WO 2005/086260 | A1 | 9/2005 |
| WO | WO 2017/197299 | A1 | 11/2017 |
| WO | WO 2020/150240 | A1 | 7/2020 |

OTHER PUBLICATIONS

Extended European Search Report dated Oct. 17, 2022 for corresponding European Application No. 22160620.5, 6pp.
Office action for corresponding JP Patent Application No. 2022-035218 dated May 8, 2023, 4pp.
Office Action dated Jan. 29, 2024 for corresponding CN Patent Application No. 202210220653.5, 14pp. includes English translation.
Choi Jaecheol et al., "Highly Adhesive and Soluble Copolyimide Binder: Improving the Long-Term Cycle Life of Silicon Anodes in Lithium-Ion Batteries", ACS Appl. Mater. Interfaces 2015, 7, 14851-14858; DOI: 10.1021/acsami.5b03364 (8 pages).
Kim, Kyuman et al., "Elucidating the Polymeric Binder Distribution within Lithium-ion Battery Electrodes using SAICAS", ChemPhysChem, 2018, 19, 10.1002/cphc.201800072, 1627-1634 (10 pages).
Son Bongki et al., "Measurement and Analysis of Adhesion Property of Lithium-Ion Battery Electrodes with SAICAS", ACS Appl. Mater. Interfaces 2014, 6, 526-531; dx.doi.org/10.1021/am404580f (7 pages).
Extended European Search Report dated May 25, 2022, in corresponding EP Patent Application No. 21218366.9 (10 pages).
Japanese Office Action issued Feb. 6, 2023, in corresponding JP Patent Application No. 2022-000176, which were filed in an IDS on Apr. 17, 2023 (6 pages).
Japanese Office action issued Aug. 14, 2023, in corresponding JP Patent Application No. 2022-000176 (3 pages).
Chinese Office Action issued Jan. 10, 2024, with English translation for in CN Patent Application No. 202111651386.9 (20 pages).
Korean Office action dated Aug. 26, 2024, in corresponding KR Patent Application No. 10-2020-0188064 (82 pages).
European Office Action dated Jan. 13, 2025, issued in corresponding European Patent Application No. 21218366.9 (4 pages).
Notice Of Allowance issued in corresponding KR Patent Application No. 10-2021-0023688, dated Dec. 20, 2024, 2pp.
US Office Action dated Jan. 30, 2025, issued in U.S. Appl. No. 17/646,608 (11 pages).
US Notice of Allowance dated Jan. 21, 2025, issued in U.S. Appl. No. 17/652,009 (11 pages).
US Final Office Action dated Jul. 2, 2025, issued in U.S. Appl. No. 17/646,608 (11 pages).

* cited by examiner

ELECTRODE, LITHIUM BATTERY INCLUDING THE SAME, AND METHOD OF MANUFACTURING THE SAME

CROSS-REFERENCE TO RELATED APPLICATION

This application claims priority to and the benefit of Korean Patent Application No. 10-2021-0030362, filed on Mar. 8, 2021, in the Korean Intellectual Property Office, the entire content of which is hereby incorporated by reference.

BACKGROUND

1. Field

Embodiments of the present disclosure relate to an electrode, a lithium battery including the same, and a method of manufacturing the same.

2. Description of the Related Art

In accordance with the miniaturization and higher performance of various devices, higher densification of lithium batteries, in addition to miniaturization and weight reduction of lithium batteries, is becoming more important. In other words, high-capacity lithium batteries are becoming more important.

In order to implement a lithium battery suitable for the use described above, electrodes having high loading have been studied.

In an electrode having high loading, the distribution of components in the electrode is non-uniform and the density near the surface of the electrode is increased. Accordingly, the performance of a lithium battery using such an electrode deteriorates or is reduced.

There is a need for an electrode capable of preventing or reducing performance deterioration of a secondary battery.

SUMMARY

One or more embodiments of the present disclosure include a novel electrode having a uniform (e.g., substantially uniform) distribution of components in the electrode, thereby preventing or reducing the performance deterioration of a battery.

One or more embodiments include a lithium battery including the electrode.

One or more embodiments include a method of manufacturing the electrode.

Additional aspects of embodiments will be set forth in part in the description which follows and, in part, will be apparent from the description, or may be learned by practice of the presented embodiments of the disclosure.

According to one or more embodiments, provided is an electrode including:

an electrode active material layer including an electrode active material and a binder;

an electrode current collector on one surface or between two surfaces of the electrode active material layer; and an interlayer between the electrode active material layer and the electrode current collector, wherein the electrode active material layer includes: a first electrode active material layer contacting the interlayer and including a first electrode active material; and a second electrode active material layer arranged on the first electrode active material layer and including a second electrode active material layer, wherein the first electrode active material layer has, as measured by a surface and interfacial cutting analysis system (SAICAS), a first ratio of change of vertical relative force ($F_{VR}$) between a first point, which is 5% away from a surface of the first electrode active material layer facing way from the electrode current collector, and a second point, which is 5% away from a surface of the electrode current collector with respect to a total thickness of the first electrode active material layer, the second electrode active material layer has, as measured by the SAICAS, a second ratio of change of vertical relative force ($F_{VR}$) between a third point, which is 5% away from a surface of the second electrode active material layer facing away from the first electrode active material layer, and a fourth point, which is 5% away from the surface of the first electrode active material layer with respect to the total thickness of the second electrode active material layer, and the second ratio of change of the second electrode active material layer is 300% or less.

According to one or more embodiments, provided is an electrochemical battery including:

a cathode; an anode; and an electrolyte between the cathode and the anode, wherein at least one selected from the cathode and the anode is the electrode described above.

According to one or more embodiments, provided is a method of manufacturing the electrode, the method including:

preparing at least two mixtures by dry mixing an electrode active material, a dry conductive material, and a dry binder;

providing an electrode current collector having an interlayer located on one surface or two surfaces thereof; and simultaneously or sequentially providing and then pressing the at least two mixtures on one surface or two surfaces of the electrode current collector to thereby manufacture an electrode having an electrode active material layer on the one or two surfaces of the electrode current collector, wherein the electrode active material layer includes a first electrode active material layer including a first electrode active material, and a second electrode active material layer including a second electrode active material, wherein the first electrode active material layer has, as measured by a surface and interfacial cutting analysis system (SAICAS), a first ratio of change of vertical relative force ($F_{VR}$) between a first point, which is 5% away from a surface of the first electrode active material layer facing away from the electrode current collector, and a second point, which is 5% away from a surface of the electrode current collector with respect to a total thickness of first electrode active material layer, the second electrode active material layer has, as measured by the SAICAS, a second ratio of change of vertical relative force ($F_{VR}$) between a third point, which is 5% away from a surface of the second electrode active material layer facing away from the first electrode active material layer, and a fourth point, which is 5% away from the surface of the first electrode active material layer with respect to the total thickness of the second electrode active material layer, and the second ratio of change of the second electrode active material layer is 300% or less.

BRIEF DESCRIPTION OF THE DRAWINGS

The above and other aspects and features of certain embodiments of the disclosure will be more apparent from the following description taken in conjunction with the accompanying drawings, in which.

DETAILED DESCRIPTION

Figure 1:
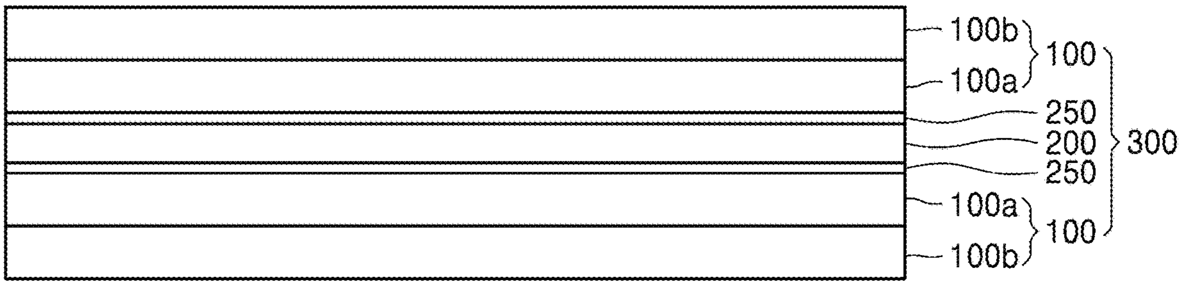
FIG. 1 is a cross-sectional view of an electrode according to an embodiment.

Reference will now be made in more detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of embodiments of the present description. As used herein, the term "and/or" includes any and all combinations of one or more of the associated listed items. Expressions such as "at least one of," when preceding a list of elements, modify the entire list of elements and do not modify the individual elements of the list.

The present disclosure will now be described more fully with reference to the accompanying drawings, in which example embodiments are shown. The subject matter of the present disclosure may, however, be embodied in many different forms, and should not be construed as being limited to the embodiments set forth herein. Rather, these embodiments are provided so that this disclosure will be thorough and complete, and will fully convey the effects and features of the present disclosure and ways to implement the subject matter of the present disclosure to those skilled in the art. Accordingly, the subject matter of the present disclosure should be construed as including all modifications, equivalents, and alternatives within the scope of the present disclosure.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprise," "include," and/or "have," when used in this specification, specify the presence of stated features, integers, steps, operations, elements, and/or components, but do not preclude the presence or addition of one or more other features, integers, steps, operations, elements, components, and/or groups thereof. As used herein, the slash "/" or the term "and/or" includes any and all combinations of one or more of the associated listed items.

In the drawings, the size or thickness of each layer, region, or element may be arbitrarily exaggerated or reduced for better understanding or ease of description, and thus the present disclosure is not limited thereto. Throughout the written description and drawings, like reference numbers and labels will be used to denote like or similar elements. Throughout the specification, it will be understood that when an element such as a layer, a film, a region, or a plate is referred to as being "on" another element, it can be "directly on" the another element, or intervening elements, layers, regions, and/or the like may also be present. Throughout the specification, while the terms "first", "second", etc., may be used herein to describe various constituent elements, these components should not be limited by these terms. These terms are used only to distinguish one component from another, not for purposes of limitation.

Hereinafter, embodiments of an electrode, a lithium battery including the same, and a method of manufacturing the same will be described in more detail.

According to an embodiment, an electrode includes: an electrode active material layer including an electrode active material and a binder; an electrode current collector on one surface or between two surfaces of the electrode active material layer; and an interlayer located between the electrode active material layer and the electrode current collector. The electrode active material layer includes: a first electrode active material layer including a first electrode active material and contacting the interlayer; and a second electrode active material layer on the first electrode active material layer and including a second electrode active material. The first electrode active material layer has, as measured by a surface and interfacial cutting analysis system (SAICAS), a first ratio of change of vertical relative force ($F_{VR}$) between a first point, which is 5% away (a first distance 5% away) from a surface of the first electrode active material layer facing way from the electrode current collector, and a second point, which is 5% away (a second distance 5% away) from the surface of the electrode current collector with respect to a total thickness of the first electrode active material layer, the second electrode active material layer has, as measured by the SAICAS, a second ratio of change of vertical relative force ($F_{VR}$) between a third point, which is 5% away (a third distance 5% away) from a surface of the second electrode active material layer facing away from the first electrode active material layer, and a fourth point, which is 5% away (a fourth distance 5% away) from the surface of the first electrode active material layer with respect to the total thickness of the second electrode active material layer. The second ratio of change of the second electrode active material layer is 300% or less. Thus, according to embodiments of the present disclosure, the first distance and the second distance may each be measured relative to the total thickness of the first electrode active material layer, and the third distance and the fourth distance may each be measured relative to the total thickness of the second electrode active material layer.

The first ratio of change and the second ratio of change of vertical relative force are calculated by Equation 1. For a measurement method using the SAICAS, for example, Evaluation Example 1 described later may be referred to.

$$\text{Ratio of change of vertical relative force } (F_{VR}) = [(\text{Maximum value of vertical relative force} - \text{Minimum value of vertical relative force})/\text{Minimum value of vertical relative force}] \times 100\% \quad \text{Equation 1}$$

In the electrode, because the second ratio of change of the second electrode active material layer is 300% or less, as measured by the SAICAS, uniformity of the distribution of components of the second electrode active material layer is improved. In addition, because a side reaction and an increase in internal resistance due to non-uniform distribution of components in the second electrode active material layer are suppressed or reduced, the reversibility of electrode reaction may be improved. Even in the case of an electrode having high loading, cycle characteristics of the lithium battery are improved. The second ratio of change may be, for example, about 10% to about 300%, about 20% to about 250%, about 30% to about 200%, about 40% to about 160%, about 50% to about 150%, or about 60% to about 140%.

In the electrode, for example, the first ratio of change of the first electrode active material layer may be 300% or less, as measured by the SAICAS. Because the first ratio of change of vertical relative force of the first electrode active material layer is 300% or less, uniformity of the distribution of components of the first electrode active material layer in the electrode is improved. In addition, because a side reaction and an increase in internal resistance due to non-uniform distribution of components in the first electrode active material layer are suppressed or reduced, the reversibility of electrode reaction may be improved. Even in the case of an electrode having high loading, cycle characteristics of the lithium battery are improved. The first ratio of change may be, for example, about 10% to about 300%, about 20% to about 250%, about 30% to about 200%, about 40% to about 160%, about 50% to about 150%, or about 60% to about 140%.

In the electrode, for example, the first ratio of change of vertical relative force of the first electrode active material layer, and the second ratio of change of vertical relative force of the second electrode active material layer may each be 300% or less, as measured by the SAICAS. Because the first ratio of change of vertical relative force of the first electrode active material layer and the second ratio of change of vertical relative force of the second electrode active material layer are each 300% or less, uniformity of the distribution of components of the first electrode active material layer and the second electrode active material layer in the electrode is improved. In addition, because a side reaction and an increase in internal resistance due to non-uniform distribution of components in the first electrode active material layer and the second electrode active material layer are suppressed or reduced, reversibility of electrode reaction may be improved. Even in the case of an electrode having high loading, cycle characteristics of the lithium battery are improved. In addition, because the electrode includes the interlayer, the binding strength between the electrode active material layer and the electrode current collector is further improved, and the internal resistance of the electrode is further reduced. Accordingly, cycle characteristics of a lithium battery using the electrode are improved. The first ratio of change and the second ratio of change may each independently be, for example, about 10% to about 300%, about 20% to about 250%, about 30% to about 200%, about 40% to about 160%, about 50% to about 150%, or about 60% to about 140%. In the electrode, as measured by the SAICAS, a horizontal force ratio of a second horizontal force ($F_{HA2}$) at a second point (a sixth point) to a first horizontal force ($F_{HA1}$) at a first point (a fifth point) is 50% or greater, wherein the first point, which is 10% away (a fifth distance 10% away) from the surface of the second cathode active material layer (e.g., surface of the cathode active material layer) facing away from the electrode current collector, and the second point, which is 10% away (a sixth distance 10% away) from the surface of the electrode current collector with respect to the total thickness of the cathode active material layer comprising the first electrode active material layer and the second cathode active material layer. The horizontal force ratio may be, for example, about 50% to about 300%, about 50% to about 250%, about 50% to about 200%, about 50% to about 150%, or about 50% to about 100%. For example, the horizontal force ratio is represented by Equation 2.

$$\text{Horizontal force ratio} = [\text{Second horizontal force } (F_{H2})/\text{First horizontal force } (F_{H1})] \times 100\% \quad \text{Equation 2}$$

In the electrode, because the horizontal force ratio is 50% or greater, as measured by the SAICAS, uniformity of the distribution of components in the electrode is further improved. Because the electrode has a horizontal force ratio within this range, cycle characteristics of a lithium battery including the electrode are further improved.

In the electrode, the first electrode active material layer has, as measured by the SAICAS, a first mean value of vertical relative force ($F_{VR}$) between the first point, which is 5% away (the first distance 5% away) from a surface of the first electrode active material layer (e.g., an interface between the first active material layer and the second active material layer) facing away from the electrode current collector, and the second point, which is 5% away (the second distance 5% away) from the surface of the electrode current collector with respect to the total thickness of the first electrode active material layer, and the second electrode active material layer has, as measured by the SAICAS, a second mean value of vertical relative force ($F_{VR}$) between the third point, which is 5% away (the third distance 5% away) from the surface of the second electrode active material layer facing away from the first electrode active material layer, and the fourth point, which is 5% away (the fourth distance 5% away) from the surface of the first electrode active material layer (e.g., an interface between the first active material layer and the second active material layer) with respect to the total thickness of the second electrode active material layer, and the first mean value of the first electrode active material layer may be greater than the second mean value of the second electrode active material.

In the electrode, because the first mean value of vertical relative force of the first electrode active material layer is greater than the second mean value of vertical relative force of second electrode active material layer, the binding strength of the first electrode active material layer may be greater than that of the second electrode active material layer. Accordingly, the first electrode active material layer strongly binds to the electrode current collector, peeling of the electrode active material layer from the electrode current collector is effectively prevented or reduced during charging and discharging processes. As a result, cycle characteristics of a lithium battery using the electrode are improved. For example, the first mean value may be a value greater than the second mean value by about 10% to about 200%, about 10% to about 150%, about 10% to about 100%, or about 10% to about 50%.

In the electrode, the first electrode active material and the second electrode active material may be, for example, a same electrode active material. For example, the first electrode active material and the second electrode active material may be, for example, electrode active materials having the same composition. For example, the first electrode active material and the second electrode active material may be, for example, electrode active materials having a same crystalline structure. For example, the first electrode active material and the second electrode active material may be electrode active materials having a layered crystalline structure. For example, the first electrode active material and the second electrode active material may be electrode active materials having a spinel crystalline structure. For example, the first electrode active material and the second electrode active material may be electrode active materials having an olivine crystalline structure. The present disclosure, however, is not limited to the above.

In other embodiments of the electrode, the first electrode active material and the second electrode active material may be, for example, different electrode active materials. For example, the first electrode active material and the second electrode active material may be, for example, electrode active materials having different compositions. For example, the first electrode active material and the second electrode active material may be, for example, electrode active materials having different crystalline structures. For example, the first electrode active material may be an electrode active material having a layered crystalline structure, and the second electrode active material may be an electrode active material having a spinel crystalline structure or an olivine crystalline structure. For example, the first electrode active material may be an electrode active material having a spinel crystalline structure, and the second electrode active material may be an electrode active material having a layered crystalline structure or an olivine crystalline structure. For example, the first electrode active material may be an electrode active material having an olivine crystalline structure, and the second electrode active material may be an electrode active material having a layered crystalline structure or a spinel crystalline structure.

The electrode may further include a third electrode active material layer arranged between the first electrode active material layer and the second electrode active material layer. The third electrode active material layer may have, as measured by the SAICAS, a third mean value of vertical relative force ($F_{VR}$) between a point (a seventh point), which is 5% away (a seventh distance 5% away) from a surface of the third electrode active material layer facing away from the first electrode active material layer, and to a point (an eighth point), which is 5% away (an eighth distance 5% away) from the surface of the first electrode active material layer with respect to the total thickness of the third electrode active material layer.

The third mean value may be, for example, greater than the first mean value. For example, the third mean value may be a value greater than the first mean value by about 10% to about 200%, about 10% to about 150%, about 10% to about 100%, or about 10% to about 50%. Accordingly, the vertical relative force of the third electrode active material layer may be the greatest value, the vertical relative force of the second electrode active material layer may be the smallest value, and the vertical relative force of the first electrode active material layer may be a value between these two values. In other embodiments, the third mean value may be, for example, greater than the second mean value and smaller than the first mean value. Accordingly, the vertical relative force of the first electrode active material layer may be the greatest value, the vertical relative force of the second electrode active material layer may be the smallest value, and the vertical relative force of the third electrode active material layer may be a value between these two values. For example, the third mean value may be a value greater than the second mean value by about 10% to about 200%, about 10% to about 150%, about 10% to about 100%, or about 10% to about 50%, and the first mean value may be a value greater than the third mean value by about 10% to about 200%, about 10% to about 150%, about 10% to about 100%, or about 10% to about 50%.

In the electrode, a porosity of the first electrode active material layer may be, for example, smaller than that of the second electrode active material layer. Because the second electrode active material layer constituting an electrode surface has a higher porosity compared to that of the first electrode active material layer adjacent to the electrode current collector, a liquid electrolyte may more easily permeate into the electrode, and thus, reversibility of the electrode reaction may be improved. As a result, cycle characteristics of a lithium battery using the electrode may be improved. The second electrode active material layer may have a porosity of about 10% to about 50%. The porosity of the first electrode active material layer may be about 10% to about 95%, about 20% to about 95%, about 30% to about 95%, about 40% to about 95%, about 50% to about 95%, about 60% to about 95%, or about 70% to about 95% of the porosity of the second electrode active material layer. The porosity may be calculated by, for example, subtracting the volume of components, which is obtained from the weights and theoretical densities of the components, from the total volume of the electrode. In other words, the porosity may be measured by a gas adsorption method.

The electrode may further include a third electrode active material layer arranged between the first electrode active material layer and the second electrode active material layer, and a porosity of the third electrode active material layer may be smaller than that of the first electrode active material layer. Accordingly, in some embodiments, the porosity of the third electrode active material layer may be the smallest, the porosity of the second electrode active material layer may be the greatest, and the porosity of the first electrode active material layer may be a value between these two values (the respective porosity values of the second electrode active material layer and the third electrode active material layer). For example, the porosity of the first electrode active material layer may be about 10% to about 95% of that of the second electrode active material layer, and the porosity of the third electrode active material layer may be about 10% to about 95% of that of the first electrode active material layer. In other embodiments, the porosity of the third electrode active material layer may be greater than that of the first electrode active material layer and smaller than that of the second electrode active material layer. Accordingly, in some embodiments, the porosity of the first electrode active material layer may be the smallest, the porosity of the second electrode active material layer may be the greatest, and the porosity of the third electrode active material layer may be a value between these two values. For example, the porosity of the third electrode active material layer may be about 10% to about 95%, about 20% to about 95%, about 30% to about 95%, about 40% to about 95%, about 50% to about 95%, about 60% to about 95%, or about 70% to about 95% of the porosity of the second electrode active material layer, and the porosity of the first electrode active material layer may be about 10% to about 95%, about 20% to about 95%, about 30% to about 95%, about 40% to about 95%, about 50% to about 95%, about 60% to about 95%, or about 70% to about 95% of the porosity of the third electrode active material layer.

The third electrode active material layer may include a third active material. The third electrode active material may be, for example, an electrode active material which is the same or different from the first and second electrode active materials. For example, the first electrode active material, the second electrode active material, and the third electrode active material may be electrode active materials which are the same or different from one another. The first electrode active material and the second electrode active material may be, for example, a same electrode active material, and the third electrode active material may be an electrode active material different from the first and second electrode active materials. The first electrode active material and the second electrode active material may be, for example, different electrode active materials, and the third electrode active material may be an electrode active material which is also different from the first and second electrode active materials. The first electrode active material and the second electrode active material may be, for example, different electrode active materials, and the third electrode active material may be an electrode active material which is the same as one of the first and second electrode active materials.

A material constituting the electrode current collector may be any suitable material that does not react with lithium, for example, a material that does not form an alloy or compound with lithium and has conductivity (e.g., electrical conductivity). The electrode current collector may be, for example, a metal or an alloy. The electrode current collector may include (or consist of), for example, indium (In), copper (Cu), magnesium (Mg), stainless steel, titanium (Ti), iron (Fe), cobalt (Co), nickel (Ni), zinc (Zn), aluminum (Al), germanium (Ge), lithium (Li), or an alloy thereof.

For example, the electrode current collector may have a form selected from a sheet, a foil, a film, a plate, a porous body, a mesoporous body, a through-hole containing body, a polygonal ring body, a mesh body, a foam, and a nonwoven body. However, the form of the electrode current collector is not limited to these forms and may be any suitable form used in the art.

The electrode current collector may have a reduced thickness compared to that of an electrode current collector included in an electrode of the related art. Accordingly, due to the inclusion of a thin-film current collector, the electrode according to an embodiment is distinguished from electrodes of the related art including a thick-film current collector. Because the electrode according to an embodiment includes a thin-film current collector having a reduced thickness, the thickness of the electrode active material layer is relatively increased in the electrode including the thin-film current collector. As a result, an energy density of a lithium battery including the electrode is increased. The thickness of the electrode current collector may be, for example, less than 15 μm, 14.5 μm or less, or 14 μm or less. The thickness of the electrode current collector may be, for example, about 0.1 μm to less than 15 μm, about 1 μm to about 14.5 μm, about 2 μm to about 14 μm, about 3 μm to about 14 μm, about 5 μm to about 14 μm, or about 10 μm to about 14 μm.

The electrode current collector may have a reduced surface roughness compared to that of an electrode current collector included in an electrode of the related art. Because the electrode current collector surface has a reduced surface roughness, the electrode current collector may form a uniform (e.g., substantially uniform) interface with the electrode active material layer and/or the interlayer. As a result, local side reactions and/or non-uniform electrode reactions at the interface between the electrode current collector and other layers are suppressed or reduced, and cycle characteristics of a lithium battery including the electrode are improved. The surface roughness may be measured by using an image taken with an atomic force microscope (AFM) and the like, for example, an optical profiler.

A maximum roughness depth ($R_{max}$) of the electrode current collector surface may be, for example, 3 μm or less, 2 μm or less, 1 μm or less, 0.5 μm or less, or 0.1 μm or less. The maximum roughness depth ($R_{max}$) of the electrode current collector surface may be, for example, about 10 nm to about 3 μm, about 10 nm to about 2 μm, about 10 nm to about 1 μm, about 10 nm to about 0.5 μm, or about 10 nm to about 0.1 μm. Maximum roughness depth ($R_{max}$) may be a vertical distance between the highest peak and the lowest valley within a reference length of a roughness cross-section curve (roughness profile).

A mean roughness ($R_a$) of the electrode current collector surface may be, for example, 2 μm or less, 1 μm or less, 0.5 μm or less, or 0.1 μm or less. The mean roughness ($R_a$) of the electrode current collector surface may be, for example, about 10 nm to about 2 μm, about 10 nm to about 1 μm, about 10 nm to about 0.5 μm, or about 10 nm to about 0.1 μm. Mean roughness ($R_a$) is also referred to as center line average roughness, which may be obtained as an arithmetic average of absolute values of ordinates (length from center to peak) within the reference length of the roughness profile.

A root mean square (RMS) roughness ($R_q$) of the electrode current collector surface may be, for example, 2 μm or less, 1 μm or less, 0.5 μm or less, or 0.1 μm or less. The RMS roughness ($R_q$) of the electrode current collector surface may be, for example, about 10 nm to about 2 μm, about 10 nm to about 1 μm, about 10 nm to about 0.5 μm, or about 10 nm to about 0.1 μm. Root mean square (RMS) roughness ($R_q$) may be a root average square of vertical values within the reference length of the roughness profile. As for such surface roughness, parameters and measurement methods defined in KS B 0601 or ISO 4287/1 may be referred to.

The binder included in the electrode active material layer may be, for example, a dry binder. The dry binder is, for example, a binder that is not impregnated, dissolved, or dispersed in a solvent. The dry binder is, for example, a binder that does not include a solvent or is not in contact with a solvent. The dry binder may be, for example, a fibrillized binder. The fibrillized binder may act as a matrix that supports and binds the electrode active material and other components included in the electrode active material layer. It can be confirmed that the fibrillized binder has a fibrous shape, for example, from a scanning electron microscope image of a cross-section of the electrode. The fibrillized binder may have, for example, an aspect ratio of 10 or greater, 20 or greater, 50 or greater, or 100 or greater.

The dry binder may be, for example, polytetrafluoroethylene (PTFE), a polyvinylidene fluoride-hexapropylene (PVDF-HFP) copolymer, polyvinylidene fluoride (PVDF), polyvinyl alcohol, polyacrylonitrile, carboxymethylcellulose (CMC), starch, hydroxypropylcellulose, cellulose, polyvinylpyrrolidone, polyethylene, polypropylene, ethylene-propylene-diene polymer (EPDM), sulfonated-EPDM, styrene butadiene rubber (SBR), fluororubber, or a mixture thereof. However, the dry binder is not limited thereto, and any suitable binder used in manufacturing a dry electrode may be used. In some embodiments, the dry binder may include a fluorine-based binder. The fluorine-based binder may be, for example, polytetrafluoroethylene (PTFE), polyvinylidenefluoride-hexafluoropropylene (PVDF-HFP) copolymer, and/or polyvinylidene fluoride (PVDF).

The amount of the dry binder included in the electrode active material layer may be, for example, about 1 wt % to about 10 wt %, or about 1 wt % to about 5 wt %, based on the total weight of the electrode active material layer. When the amount of the dry binder in the electrode active material layer is within these ranges, the electrode may have improved binding strength and may maintain high energy density.

The electrode active material layer may be, for example, a self-standing film. For example, the electrode active material layer may maintain a film shape without a support. Accordingly, the electrode active material layer may be prepared as a separate self-standing film, and then arranged on the electrode current collector. Because the electrode active material layer is manufactured in a dry process, a process solvent that is intentionally added may not be included therein. For example, a residual process solvent may not be included. In some embodiments, an unintended trace of a solvent may remain in the electrode active material layer, but the solvent is not a process solvent that is intentionally added. Thus, the electrode active material layer is distinguished from a wet electrode active material layer that is manufactured by mixing components and a process solvent and then removing some or all of the process solvent by drying.

The electrode active material layer may further include, for example, a conductive material (an electrically conductive material). The conductive material may be, for example, a dry conductive material. The dry conductive material is, for example, a conductive material that is not impregnated, dissolved, or dispersed in a solvent. The dry conductive material is, for example, a conductive material that does not include a solvent or is not in contact with a solvent. The dry conductive material includes, for example, a carbonaceous conductive material. The carbonaceous conductive material may be carbon black, graphite fine particles, natural graphite, artificial graphite, acetylene black, ketjen black, carbon fiber, and/or carbon nanotubes, but is not limited thereto, and may be any suitable material that used as a carbonaceous conductive material in the art.

The amount of the dry conductive material included in the electrode active material layer may be, for example, about 1 wt % to about 10 wt %, or about 1 wt % to about 5 wt %, with respect to the total weight of the electrode active material layer. When the amount of the dry conductive material in the electrode active material layer is within these ranges, the electrode may have improved conductivity, and a lithium battery including the electrode may have improved cycle characteristics.

An interlayer may be provided, for example, directly on one or two surfaces of the electrode current collector. Therefore, another layer may not be between the electrode current collector and the interlayer. Because the interlayer is directly on one or two surfaces of the electrode current collector, the binding strength between the electrode current collector and the electrode active material layer may be further improved.

A thickness of the interlayer may be, for example, about 0.01% to about 30%, about 0.1% to about 30%, about 0.5% to about 30%, about 1% to about 25%, about 1% to about 20%, about 1% to about 15%, about 1% to about 10%, about 1% to about 5%, or about 1% to about 3% of the thickness of the electrode current collector. A thickness of the interlayer may be, for example, about 10 nm to about 5 μm, about 50 nm to about 5 μm, about 200 nm to about 4 μm, about 500 nm to about 3 μm, about 500 nm to about 2 μm, about 500 nm to about 1.5 μm, or about 700 nm to about 1.3 μm. When the interlayer has a thickness within these ranges, the binding strength between the electrode current collector and the electrode active material layer is further improved, and an increase in interfacial resistance is suppressed or reduced.

The interlayer may include, for example, a binder. Due to the inclusion of the binder in the interlayer, the binding strength between the electrode current collector and the electrode active material layer may be further improved. The binder included in the interlayer may be, for example, a conductive binder or a non-conductive binder. The conductive binder may be, for example, an ionically conductive binder, and/or an electronically conductive binder. The binder having both ionically conductive and electronically conductive properties may belong to both an ionically conductive binder and an electronically conductive binder.

The ionically conductive binder may be, for example, polystyrene sulfonate (PSS), polyvinylidene fluoride-hexafluoropropylene copolymer (PVDF-HFP), polyvinyl fluoride (PVF), poly vinylidene fluoride (PVDF), polymethyl methacrylate (PMMA), polyethylene oxide (PEO), polyethylene glycol (PEG), polyacrylonitrile (PAN), polytetrafluoroethylene (PTFE), polyethylenedioxythiophene (PEDOT), polypyrrole (PPY), polyacrylonitrile (PAN), polyaniline, polyacetylene, and/or the like. The ionically conductive binder may include a polar functional group. The ionically conductive binder containing a polar functional group may be, for example, Nafion, Aquivion, Flemion, Gore, Aciplex, Morgane ADP, sulfonated poly(ether ether ketone) (SPEEK), sulfonated poly(arylene ether ketone ketone sulfone) (SPAEKKS), sulfonated poly(aryl ether ketone), (SPAEK), poly[bis(benzimidazobenzisoquinolinones)] (SPBIBI), poly(styrene sulfonate) (PSS), lithium 9,10-diphenylanthracene-2-sulfonate ($DPASLi^+$), and/or the like. The electronically conductive binder may be, for example, polyacetylene, polythiophene, polypyrrole, poly(p-phenylene), poly(phenylenevinylene), poly(phenylenesulfide), polyaniline, and/or the like. The interlayer may be, for example, a conductive layer including a conductive polymer.

The binder included in the interlayer may be selected from binders included in the electrode active material layer. The interlayer may include a binder that is the same as that of the electrode active material layer. The binder included in the interlayer may be, for example, a fluorine-based binder. The fluorine-based binder contained in the interlayer may be, for example, polyvinylidene fluoride (PVDF). The interlayer may be on the electrode current collector by, for example, a dry method or a wet method. The interlayer may be, for example, a binding layer including a binder.

The interlayer may include, for example, a carbonaceous conductive material. The carbonaceous conductive material included in the interlayer may be selected from carbonaceous conductive materials included in the electrode active material layer. The interlayer may include a carbonaceous conductive material that is the same as that of the electrode active material layer. Due to the inclusion of the carbonaceous conductive material, the interlayer may be, for example, a conductive layer. The interlayer may be, for example, a conductive layer including a binder and a carbonaceous conductive material.

The interlayer may be on the electrode current collector in a dry manner by, for example, chemical vapor deposition (CVD), physical vapor deposition (PVD), and/or the like. The interlayer may be on the electrode current collector in a wet manner, for example by spin coating, dip coating, and/or the like. The interlayer may be provided on the electrode current collector by, for example, depositing a carbonaceous conductive material on the electrode current collector by vapor deposition. The interlayer formed by dry coating may include a carbonaceous conductive material and may not include a binder. In some embodiments, the interlayer may be on the electrode current collector by, for example, coating and drying a composition including a carbonaceous conductive material, a binder, and a solvent on the surface of the electrode current collector. The interlayer may have a single-layer structure or a multilayer structure including a plurality of layers.

The electrode may be, for example, a cathode. The cathode may include a cathode active material layer, and the cathode active material layer may include a cathode active material.

The cathode active material included in the cathode active material layer is lithium metal oxide, and any suitable lithium metal oxide that is generally used in the art may be used without limitation.

The cathode active material may be, for example, one or more composite oxides of a metal with lithium, the metal being selected from cobalt, manganese, nickel, and a combination thereof, and, for example, may be, for example, a compound represented by one of the following formulae: $Li_aA_{1-b}B_bD_2$ (wherein $0.90 \le a \le 1$ and $0 \le b \le 0.5$); $Li_aE_{1-b}B_bO_{2-c}D_c$ (wherein $0.90 \le a \le 1$, $0 \le b \le 0.5$, and $0 \le c \le 0.05$); $LiE_{2-b}B_bO_{4-c}D_c$ (wherein $0 \le b \le 0.5$, and $0 \le c \le 0.05$); $Li_aNi_{1-b-c}Co_bB_cD_\alpha$ (wherein $0.90 \le a \le 1$, $0 \le b \le 0.5$, $0 \le c \le 0.05$, and $0 < \alpha \le 2$); $Li_aNi_{1-b-c}Co_bB_cO_{2-\alpha}F_\alpha$ (wherein $0.90 \le a \le 1$, $0 \le b \le 0.5$, $0 \le c \le 0.05$, and $0 < \alpha < 2$); $Li_aNi_{1-b-c}Co_bB_cO_{2-\alpha}F_2$ (wherein $0.90 \le a \le 1$, $0 \le b \le 0.5$, $0 \le c \le 0.05$, and $0 < \alpha < 2$); $Li_aNi_{1-b-c}Mn_bB_cD_\alpha$ (wherein $0.90 \le a \le 1$, $0 \le b \le 0.5$, $0 \le c \le 0.05$, and $0 < \alpha \le 2$); $Li_aNi_{1-b-c}Mn_bB_cO_{2-\alpha}F_\alpha$ (wherein $0.90 \le a \le 1$, $0 \le b \le 0.5$, $0 \le c \le 0.05$, and $0 < \alpha < 2$); $Li_aNi_{1-b-c}Mn_bB_cO_{2-\alpha}F_2$ (wherein $0.90 \le a \le 1$, $0 \le b \le 0.5$, $0 \le c \le 0.05$, and $0 < \alpha < 2$); $Li_aNi_bE_cG_dO_2$ (wherein $0.90 \le a \le 1$, $0 \le b \le 0.9$, $0 \le c \le 0.5$, and $0.001 \le d \le 0.1$); $Li_aNi_bCo_cMn_dG_eO_2$ (wherein $0.90 \le a \le 1$, $0 \le b \le 0.9$, $0 \le c \le 0.5$, $0 \le d \le 0.5$, and $0.001 \le e \le 0.1$); $Li_aNiG_bO_2$ (wherein $0.90 \le a \le 1$, and $0.001 \le b \le 0.1$); $Li_aCoG_bO_2$ (wherein $0.90 \le a \le 1$, and $0.001 \le b \le 0.1$); $Li_aMnG_bO_2$ (wherein $0.90 \le a \le 1$, and $0.001 \le b \le 0.1$); $Li_aMn_2G_bO_4$ (wherein $0.90 \le a \le 1$, and $0.001 \le b \le 0.1$); $QO_2$; $QS_2$; $LiQS_2$; $V_2O_5$; $LiV_2O_5$; $LiIO_2$; $LiNiVO_4$; $Li_{(3-f)}J_2(PO_4)_3$ (wherein $0 \le f \le 2$); $Li_{(3-f)}Fe_2(PO_4)_3$ (wherein $0 \le f \le 2$); and $LiFePO_4$.

In the formulae of the compounds described above, A may be Ni, Co, Mn, or a combination thereof; B may be Al, Ni, Co, Mn, Cr, Fe, Mg, Sr, V, a rare-earth element, or a combination thereof; D may be O, F, S, P, or a combination thereof; E may be Co, Mn, or a combination thereof; F may be F, S, P, or a combination thereof; G may be Al, Cr, Mn, Fe, Mg, La, Ce, Sr, V, or a combination thereof; Q may be Ti, Mo, Mn, or a combination thereof; I may be Cr, V, Fe, Sc, Y, or a combination thereof; and J may be V, Cr, Mn, Co, Ni, Cu, or a combination thereof.

The compounds described above may have a coating layer added onto the surface thereof, and such compounds having a coating layer may be used. A mixture of the compounds described above without a coating layer and compounds having a coating layer may be used. The coating layer added onto the surface of the compounds listed above may include, for example, a coating element compound, such as an oxide of the coating element, a hydroxide of the coating element, an oxyhydroxide of the coating element, an oxycarbonate of the coating element, or a hydroxycarbonate of the coating element. The compounds for the coating layer may be amorphous or crystalline. The coating element for the coating layer may be magnesium (Mg), aluminum (Al), cobalt (Co), potassium (K), sodium (Na), calcium (Ca), silicon (Si), titanium (Ti), vanadium (V), tin (Sn), germanium (Ge), gallium (Ga), boron (B), arsenic (As), zirconium (Zr), or a mixture thereof. A method for forming the coating layer may be selected within a range not adversely affecting the physical or chemical properties of the cathode active material. For example, the coating layer may be formed using a coating method, for example, a spray coating or dipping. The coating methods may be well understood by a person of ordinary skill in the art, and thus, duplicative descriptions thereof will not be repeated here.

The cathode active material may be, for example, a composite cathode active material.

The composite cathode active material includes, for example, a core including a lithium transition metal oxide and a shell provided along the surface of the core, wherein the shell includes: at least one first metal oxide represented by $M_aO_b$ (wherein $0 < a \le 3$, $0 < b < 4$, and b is not an integer when a is 1, 2, or 3); and graphene, wherein the first metal oxide is in a graphene matrix, M is at least one metal selected from Groups 2 to 13, 15 and 16 of the periodic table of the elements, and the lithium transition metal oxide includes nickel, and the amount of nickel is 80 mol % or more based on the total molar number of the transition metal. A shell including a first metal oxide and graphene is on the core of the composite cathode active material.

In the related art, it is difficult to coat a core with graphene, because the graphene agglomerates. In contrast, the composite cathode active material of the present disclosure uses a composite including a plurality of first metal oxides in a graphene matrix. Accordingly, the agglomeration of graphene is prevented or reduced and a uniform (e.g., substantially uniform) shell may be on the core. Accordingly, contact between the core and the liquid electrolyte may be effectively blocked or reduced, and thus, side reactions due to the contact between the core and the liquid electrolyte are prevented or reduced. In addition, the reduction of nickel ions ($Ni^{3+} \rightarrow Ni^{2+}$) and cation mixing, due to the liquid electrolyte, are suppressed or reduced, and thus, the creation of a resistance layer such as a NiO phase may be suppressed or reduced. Furthermore, the release of nickel ions is also suppressed or reduced. The shell containing graphene has flexibility, and thus, easily can withstand a volume change of the composite cathode active material during charging and discharging, thereby suppressing or reducing occurrence of cracks inside the composite cathode active material. Due to graphene having high electronic conductivity, the interfacial resistance between the composite cathode active material and liquid electrolyte is reduced. Accordingly, despite the introduction of the shell including graphene, the internal resistance of the lithium battery is maintained or reduced. In addition, because the first metal oxide has voltage resistance, deterioration of the lithium transition metal oxide included in the core may be prevented or reduced during charging and discharging at high voltage. As a result, the cycle characteristics and high temperature stability of a lithium battery containing the composite cathode active material may be improved. The shell may include, for example, one first metal oxide, or two or more different first metal oxides. In addition, while the lithium transition metal oxide included in the composite cathode active material has a high nickel amount of 80 mol % or more with respect to the total molar number of transition metal, high discharge capacity and cycle characteristics may be provided concurrently (e.g., simultaneously), due to the arrangement of the shell, which contains the first metal oxide and graphene, on the core. Therefore, the composite cathode active material having a high nickel amount of 80 mol % or more may provide improved capacity compared to a composite cathode active material having a relatively low nickel amount, and may still provide excellent lifespan characteristics. The metal included in the first metal oxide may be, for example, at least one selected from Al, Nb, Mg, Sc, Ti, Zr, V, W, Mn, Fe, Co, Pd, Cu, Ag, Zn, Sb, and Se.

The first metal oxide may be, for example, one or more selected from $Al_2O_z$ ($0<z<3$), $NbO_x$ ($0<x<2.5$), $MgO_x$ ($0<x<1$), $Sc_2O_z$ ($0<z<3$), $TiO_y$ ($0<y<2$), $ZrO_y$ ($0<y<2$), $V_2O_z$ ($0<z<3$), $WO_y$ ($0<y<2$), $MnO_y$ ($0<y<2$), $Fe_2O_z$ ($0<z<3$), $Co_3O_w$ ($0<w<4$), $PdO_x$ ($0<x<1$), $CuO_x$ ($0<x<1$), $AgO_x$ ($0<x<1$), $ZnO_x$ ($0<x<1$), $Sb_2O_z$ ($0<z<3$), and $SeO_y$ ($0<y<2$). Because the first metal oxide is in the graphene matrix, the uniformity of the shell on the core is improved, and the voltage resistance of the composite cathode active material is further improved. For example, the shell includes, as the first metal oxide, $Al_2O_x$ ($0<x<3$). The shell may further include one or more second metal oxides represented by $M_aO_c$ ($0<a\leq3$, $0<c\leq4$, and c is an integer when a is 1, 2, or 3). M is at least one metal selected from Groups 2 to 13, 15 and 16 of the periodic table of the elements. For example, the second metal oxide includes the same metal as in the first metal oxide, and c/a, which is a ratio of a and c of the second metal oxide, has a larger value than b/a, which is a ratio of a and b of the first metal oxide. For example, c/a>b/a. The second metal oxide may be, for example, selected from $Al_2O_3$, NbO, $NbO_2$, $Nb_2O_5$, MgO, $Sc_2O_3$, $TiO_2$, $ZrO_2$, $V_2O_3$, $WO_2$, $MnO_2$, $Fe_2O_3$, $Co_3O_4$, PdO, CuO, AgO, ZnO, $Sb_2O_3$, and $SeO_2$. The first metal oxide is a product of reduction of the second metal oxide. The first metal oxide may be obtained by the reduction of some or all of the second metal oxide. Therefore, the first metal oxide has a smaller oxygen amount and a higher metal oxidation number than the second metal oxide. For example, the shell includes $Al_2O_x$ ($0<x<3$) as the first metal oxide, and $Al_2O_3$ as the second metal oxide. In the composite cathode active material, for example, graphene contained in the shell and the transition metal of lithium transition metal oxide contained in the core may be chemically bound through a chemical bond. The carbon atom (C) of graphene contained in the shell and the transition metal (Me) of the lithium transition metal oxide are chemically bound to each other through a C—O-Me bond (for example, a C—O—Ni bond) via an oxygen atom. Due to the chemical binding of graphene contained in the shell, and the lithium transition metal oxide contained in the core, the core and the shell form a composite through a chemical bond. Accordingly, this composite structure is distinguished from a simple physical mixture of graphene and lithium transition metal oxide. In addition, the first metal oxide and graphene included in the shell are also chemically bound through a chemical bond. Here, the chemical bond may be a covalent bond or an ionic bond. The covalent bond may be a bond including at least one of an ester group, an ether group, a carbonyl group, an amide group, a carbonate anhydride group, and an acid anhydride group. The ionic bond may be a bond containing a carboxylate ion, an ammonium ion, or an acyl cation group. A thickness of the shell may be, for example, about 1 nm to about 5 μm, about 1 nm to about 1 μm, about 1 nm to about 500 nm, about 1 nm to about 200 nm, about 1 nm to about 100 nm, about 1 nm to about 90 nm, about 1 nm to about 80 nm, about 1 nm to about 70 nm, about 1 nm to about 60 nm, about 1 nm to about 50 nm, about 1 nm to about 40 nm, about 1 nm to about 30 nm, about 1 nm to about 20 nm, or about 1 nm to about 10 nm. Due to the shell having a thickness within these ranges, an increase in internal resistance of a lithium battery including the composite cathode active material is suppressed or reduced.

The amount of the composite included in the composite cathode active material may be 3 wt % or less, 2 wt % or less, 1 wt % or less, 0.5 wt % or less, 0.2 wt % or less, based on the total weight of the composite cathode active material. The amount of the composite may be about 0.01 wt % to about 3 wt %, about 0.01 wt % to about 1 wt %, about 0.01 wt % to about 0.7 wt %, about 0.01 wt % to about 0.6 wt %, about 0.1 wt % to about 0.5 wt %, about 0.01 wt % to about 0.2 wt %, about 0.01 wt % to about 0.1 wt %, or about 0.03 wt % to about 0.07 wt %, based on the total weight of the composite cathode active material. Due to the inclusion of the composite within these amount ranges in the composite cathode active material, the cycle characteristics of a lithium battery including the composite cathode active material are further improved. The average particle diameter of one or more selected from the first metal oxide and the second metal oxide included in the composite may be about 1 nm to about 1 μm, about 1 nm to about 500 nm, about 1 nm to about 200 nm, about 1 nm to about 100 nm, about 1 nm to about 70 nm, about 1 nm to about 50 nm, about 1 nm to about 30 nm, about 3 nm to about 30 nm, about 3 nm to about 25 nm, about 5 nm to about 25 nm, about 5 nm to about 20 nm, or about 7 nm to about 20 nm. Due to having such particle diameters in the nanometer range, the first metal oxide and/or the second metal oxide may be more uniformly distributed in the graphene matrix of the composite. Therefore, the composite may be uniformly (e.g., substantially uniformly) coated on the core without agglomeration and form a shell. In addition, due to having particle sizes within these ranges, the first metal oxide and/or the second metal oxide may be more uniformly on the core. Accordingly, because the first metal oxide and/or the second metal oxide are uniformly (e.g., substantially uniformly) on the core, voltage resistance characteristics may be more effectively exhibited. The average particle diameters of the first metal oxide and the second metal oxide may be measured by a measurement device using, for example, laser diffraction and/or dynamic light scattering. The average particle diameter is measured by using, for example, a laser scattering particle size distribution meter (for example, Horiba Corporation LA-920), and is a value of the median particle diameter (D50) at 50% by volume in a cumulative particle size distribution from the smallest to largest particles.

The core included in the composite cathode active material may include, for example, a lithium transition metal oxide represented by Formula 1:

$$Li_aNi_xCO_yM_zO_{2-b}A_b \quad \text{Formula 1}$$

wherein, in Formula 1, $1.0\leq a\leq1.2$, $0\leq b\leq0.2$, $0.8\leq x<1$, $0<y\leq0.3$, $0<z\leq0.3$, $x+y+z=1$, M is at least one selected from manganese (Mn), niobium (Nb), vanadium (V), magnesium (Mg), gallium (Ga), silicon (Si), tungsten (W), molybdenum (Mo), iron (Fe), chromium (Cr), copper (Cu), zinc (Zn), titanium (Ti), aluminum (Al), and boron (B), and A is F, S, Cl, Br, or a combination thereof.

The core included in the composite cathode active material may include, for example, at least one of lithium transition metal oxides represented by Formula 2 to 6.

$LiNi_xCo_yMn_zO_2$ Formula 2

$LiNi_xCo_yAl_zO_2$ Formula 3

In Formulae 2 and 3, 0.8≤x≤0.95, 0<y≤0.2, 0<z≤0.2, and x+y+z=1.

$LiNi_xCo_yAl_vMn_wO_2$ Formula 4

In Formula 4, 0.8≤x≤0.95, 0<y≤0.2, 0<v≤0.2, 0<w≤0.2, and x+y+v+w=1.

$Li_aM1_xM2_yPO_{4-b}X_b$ Formula 5

In Formula 5, 0.90≤a≤1.1, 0≤x≤0.9, 0≤y≤0.5, 0.9<x+y<1.1, 0≤b≤2,

M1 may be chromium (Cr), manganese (Mn), iron (Fe), cobalt (Co), nickel (Ni), copper (Cu), zirconium (Zr) or a combination thereof, M2 may be magnesium (Mg), calcium (Ca), strontium (Sr), barium (Ba), titanium (Ti), zinc (Zn), boron (B), niobium (Nb), gallium (Ga), indium (In), molybdenum (Mo), tungsten (W), aluminum (Al), silicon (Si), chromium (Cr), vanadium (V), scandium (Sc), yttrium (Y), or a combination thereof, and X may be O, F, S, P, or a combination thereof.

$Li_aM3_zPO_4$ Formula 6

In Formula 6, 0.90≤a≤1.1, 0.9≤z≤1.1, and

M3 may be chromium (Cr), manganese (Mn), iron (Fe), cobalt (Co), nickel (Ni), copper (Cu), zirconium (Zr), or a combination thereof.

The electrode may be, for example, an anode. The anode may include an anode active material layer, and the anode active material layer may include an anode active material.

The anode active material may be any suitable material that is used as an anode active material of a lithium battery in the art. For example, the anode active material may include at least one selected from lithium metal, a metal alloyable with lithium, a transition metal oxide, a non-transition metal oxide, and a carbonaceous material. The metal alloyable with lithium may be: for example, Si, Sn, Al, Ge, Pb, Bi, Sb, or a Si—Y alloy (where Y is an alkali metal, alkaline earth metal, a Group 13 element, a Group 14 element, a transition metal, a rare-earth element, or a combination element thereof, and is not Si); or a Sn—Y alloy (where Y is an alkali metal, an alkaline earth metal, a Group 13 element, a Group 14 element, a transition metal, a rare-earth element, or a combination element thereof, and is not Sn). The element Y is, for example, Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, or a combination thereof. The transition metal oxide is, for example, lithium titanium oxide, vanadium oxide, or lithium vanadium oxide. The non-transition metal oxide is, for example, $SnO_2$ or $SiO_x$ (wherein 0<x<2). The carbonaceous material is, for example, crystalline carbon, amorphous carbon, or a mixture thereof. The crystalline carbon may be, for example, graphite, such as natural graphite and/or artificial graphite in an amorphous form, a plate-like form, a flake-like form, or a spherical or fibrous form. The amorphous carbon may be, for example, soft carbon (low-temperature calcined carbon) or hard carbon, mesophase pitch carbide, calcined coke, and/or the like.

Referring to FIG. 1, an electrode 300 according to an embodiment may include: an electrode active material layer 100 which includes an electrode active material and a binder; an electrode current collector 200 arranged between two surfaces of the electrode active material layer 100; and an interlayer 250 arranged between the electrode active material layer 100 and the electrode current collector 200. The electrode active material layer 100 may include: a first electrode active material layer 100*a*, which includes a first electrode active material layer and a binder; and a second electrode active material layer 100*b*, which includes a second electrode active material layer and a binder. The first electrode active material and the second electrode active material may be the same or different from each other. The first electrode active material and the second electrode active material may each independently selected, for example, from lithium transition metal oxides represented by Formulae 1 to 4. In some embodiments, the electrode current collector 200 may be arranged only on part of the electrode active material layer 100.

Figure 2:
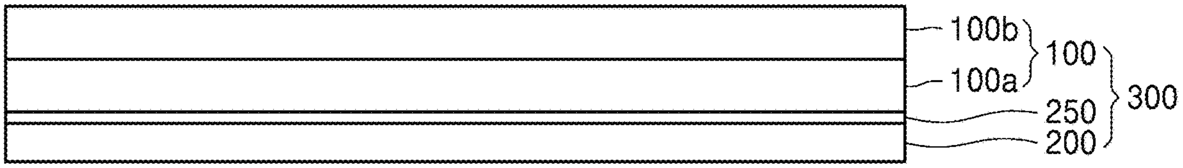
FIG. 2 is a cross-sectional view of an electrode according to an embodiment.

Referring to FIG. 2, an electrode 300 according to an embodiment may include: an electrode active material layer 100, which includes an electrode active material and a binder; an electrode current collector 200 arranged on one surface of the electrode active material layer 100; and an interlayer 250 arranged between the electrode active material layer 100 and the electrode current collector 200. The electrode active material layer 100 may include: a first electrode active material layer 100*a*, which includes a first electrode active material layer and a binder; and a second electrode active material layer 100*b*, which includes a second electrode active material layer and a binder. The first electrode active material and the second electrode active material may each independently be selected, for example, from lithium transition metal oxides represented by Formulae 1 to 6. In some embodiments, the electrode current collector 200 may be arranged only on part of the electrode active material layer 100.

Figure 3:
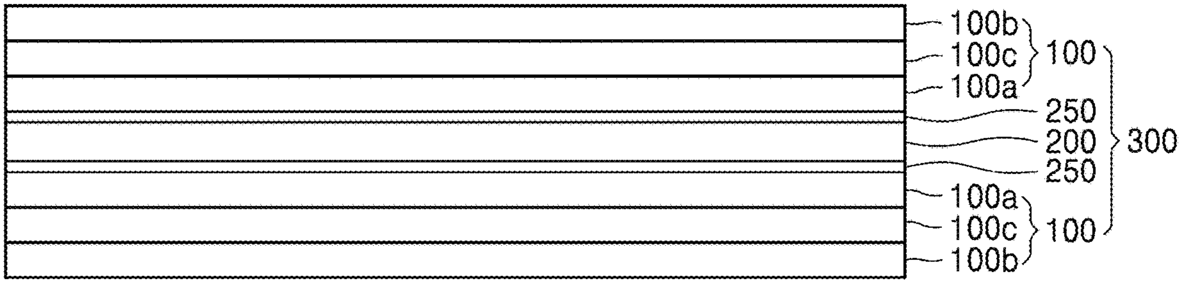
FIG. 3 is a cross-sectional view of an electrode according to an embodiment.

Referring to FIG. 3, an electrode 300 according to an embodiment may include: an electrode active material layer 100, which includes an electrode active material and a binder; an electrode current collector 200 arranged between two surfaces of the electrode active material layer 100; and an interlayer 250 arranged between the electrode active material layer 100 and the electrode current collector 200. The electrode active material layer 100 may include: a first electrode active material layer 100*a*, which includes a first electrode active material layer and a binder; a second electrode active material layer 100*b*, which includes a second electrode active material layer and a binder; and a third electrode active material layer 100*c*, which includes a third electrode active material and a binder. The first electrode active material, the second electrode active material, and the third electrode active material may be the same or different from each other.

Figure 4:
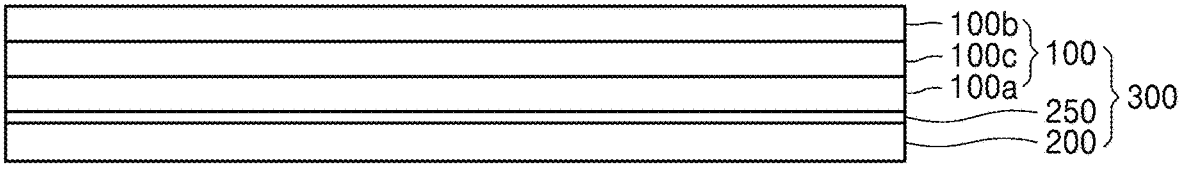
FIG. 4 is a cross-sectional view of an electrode according to an embodiment.

Referring to FIG. 4, an electrode 300 according to an embodiment may include: an electrode active material layer 100, which includes an electrode active material and a binder; an electrode current collector 200 arranged on one surface of the electrode active material layer 100; and an interlayer 250 arranged between the electrode active material layer 100 and the electrode current collector 200. The electrode active material layer 100 may include: a first electrode active material layer 100*a*, which includes a first electrode active material and a binder; a second electrode active material layer 100*b*, which includes a second electrode active material and a binder; and a third electrode active material layer 100*c*, which includes a third electrode active material and a binder.

Figure 6:
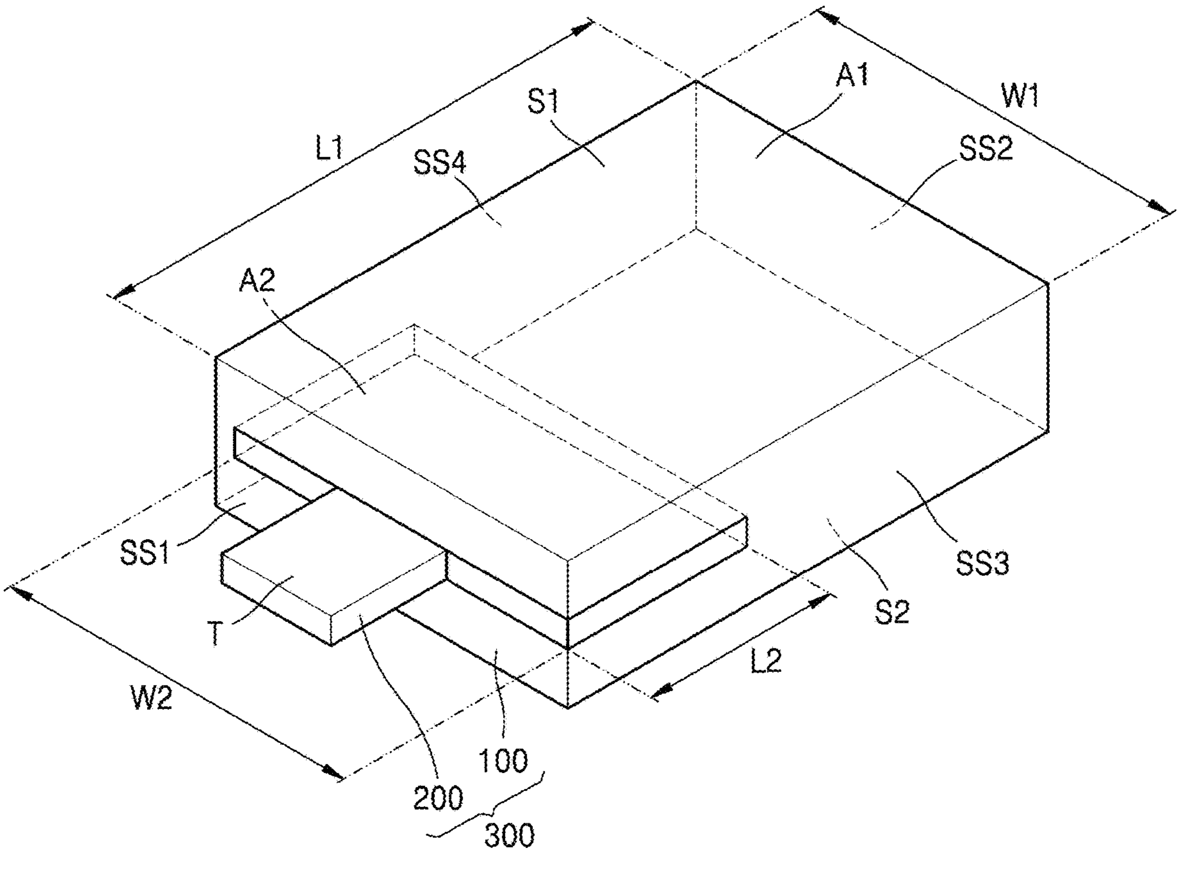
FIG. 6 is a perspective schematic view of an electrode according to an embodiment.

Referring to FIG. 6, in the electrode 300 according to an embodiment, the electrode active material layer 100 includes: a first surface S1 and a second surface S2 that is opposite to the first surface S1; a first side surface SS1 connected to or coupled to ends in the length direction of the first surface S1 and the second surface S2, and a second side surface SS2 that is opposite to the first side surface SS1; and a third side surface SS3 connected to or coupled to ends of the first surface S1 and the second surface S2 in the width directions thereof, and a fourth side surface SS4 that is opposite to the third side surface SS3. The electrode active material layer 100 has a first area A1 defined by a first lengthwise distance L1 and a first widthwise distance W1, the electrode current collector 200 is between the first surface S1 and the second surface S2, and the electrode current collector 200 has a second area A2 defined by a second lengthwise distance L2 and a second widthwise distance W2, wherein the second area A2 of the electrode current collector 200 is less than 100% of the first area A1 of the electrode active material layer 100. For example, the second area A2 of the electrode current collector 200 may be about 10% to about 90%, about 10% to about 80%, about 10% to about 70%, about 10% to about 60%, about 10% to about 50%, about 10% to about 40%, about 10% to about 30%, or about 10% to about 20%, of the first area A1 of the electrode active material layer 100.

Because the area of the electrode current collector 200 in the electrode 300 is smaller than that of the electrode active material layer 100, the energy density of a lithium battery including the electrode 300 may be improved.

Referring to FIG. 6, the second lengthwise distance L2 of the electrode current collector 200 may be less than 100% of the first lengthwise distance L1 of the electrode active material layer 100. For example, the second lengthwise distance L2 of the electrode current collector 200 may be about 10% to about 90%, about 10% to about 80%, about 10% to about 70%, about 10% to about 60%, about 10% to about 50%, about 10% to about 40%, about 10% to about 30%, or about 10% to about 20% of the first lengthwise distance L1 of the electrode active material layer 100. In other embodiments, the second widthwise distance W2 of the electrode current collector 200 may be less than 100% of the first widthwise distance W1 of the electrode active material layer 100. For example, the second widthwise distance W2 of the electrode current collector 200 may be about 10% to about 90%, about 10% to about 80%, about 10% to about 70%, about 10% to about 60%, about 10% to about 50%, about 10% to about 40%, about 10% to about 30%, or about 10% to about 20% of the first widthwise distance W1 of the electrode active material layer 100. For example, the second lengthwise distance L2 of the electrode current collector 200 may be less than 100% of the first lengthwise distance L1 of the electrode active material layer 100, and the second widthwise distance W2 of the electrode current collector 200 may be less than 100% of the first widthwise distance W1 of the electrode active material layer 100. As the electrode current collector 200 has such a size, the energy density of the lithium battery including the electrode 300 may be improved.

Referring to FIG. 6, the electrode current collector 200 may be exposed through three or fewer side surfaces selected from among the first side surface SS1, the second side surface SS2, the third side surface SS3, and the fourth side surface SS4 of the electrode active material layer 100. As the electrode current collector 200 has a smaller area than that of the electrode active material layer 100, the electrode current collector 200 may be exposed through some of the side surfaces of the electrode active material layer 100, for example, three side surfaces, two side surfaces, or one side surface thereof. As the number of the side surfaces of the electrode active material layer 100 through which the electrode current collector 200 is exposed is reduced, the possibility of a short circuit through the side surface of the electrode active material layer 100 may be reduced, and thus, the safety of the lithium battery 1000 (see FIG. 9) may be improved.

Referring to FIG. 6, the electrode current collector 200 may further include a tab T extending to the outside of the electrode active material layer 100 through two or fewer side surfaces selected from the first side surface SS1, the second side surface SS2, the third side surface SS3, and the fourth side surface SS4. For example, the tab T extends to the outside of the electrode active material layer 100 through the first side surface SS1 and/or the second side surface SS2. In some embodiments, the tab T extends to the outside of the electrode active material layer 100 through the third side surface SS3 and/or the fourth side surface SS4. As the tab T extends to the outside of the electrode active material layer 100 through one side surface or two opposite side surfaces of the electrode active material layer 100, a short circuit through a plurality of adjacent tabs T may be prevented, or a likelihood or occurrence of such a short circuit may be reduced.

In some embodiments, the electrode active material layer 100 may have a multilayer structure. For example, the electrode active material layer 100 may include a first electrode active material layer and a second electrode active material layer, or may include a first electrode active material layer, a second electrode active material layer, and a third electrode active material layer.

Referring to FIGS. 7A to 7E, the electrode current collector 200 may have various suitable shapes and may be at various suitable positions in the electrode active material layer 100.

Figure 7A:
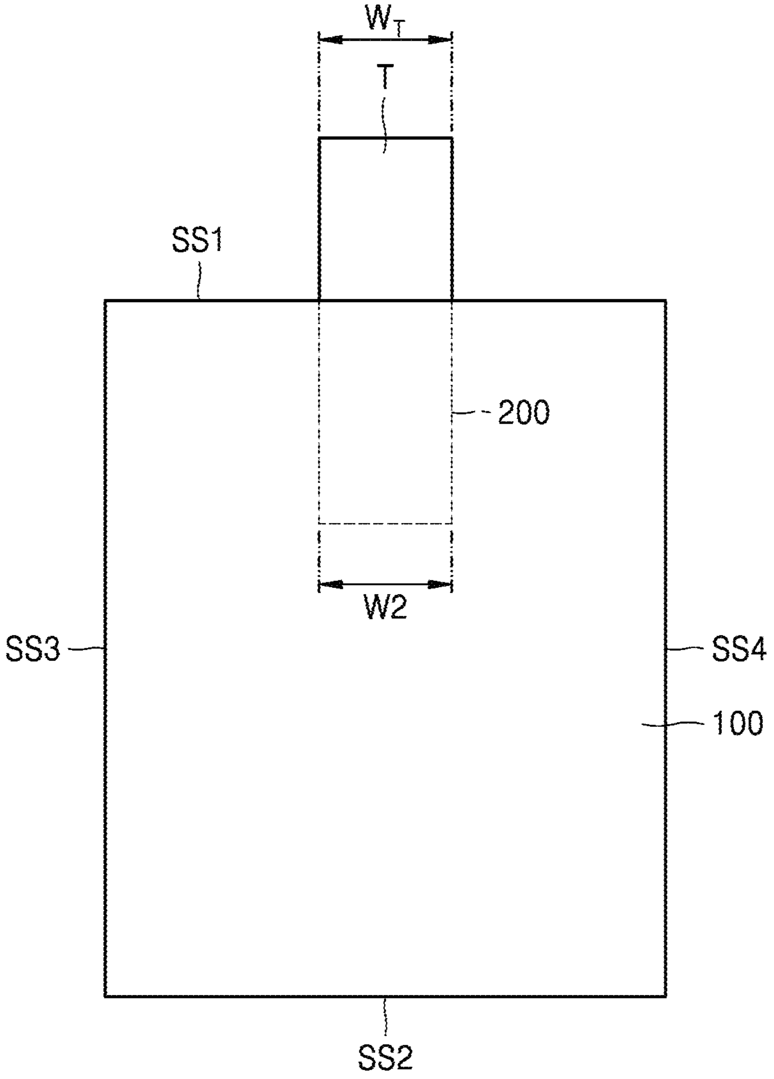
FIGS. 7A to 7F are plan views of electrodes according to embodiments.

Referring to FIG. 7A, the electrode current collector 200 is exposed through the first side surface SS1 of the electrode active material layer 100, and includes a tab T extending to the outside of the electrode active material layer 100 through the first side surface SS1. The widthwise distance $W_T$ of the tab T may be 100% of the second widthwise distance W2 of the electrode current collector 200.

Figure 7B:
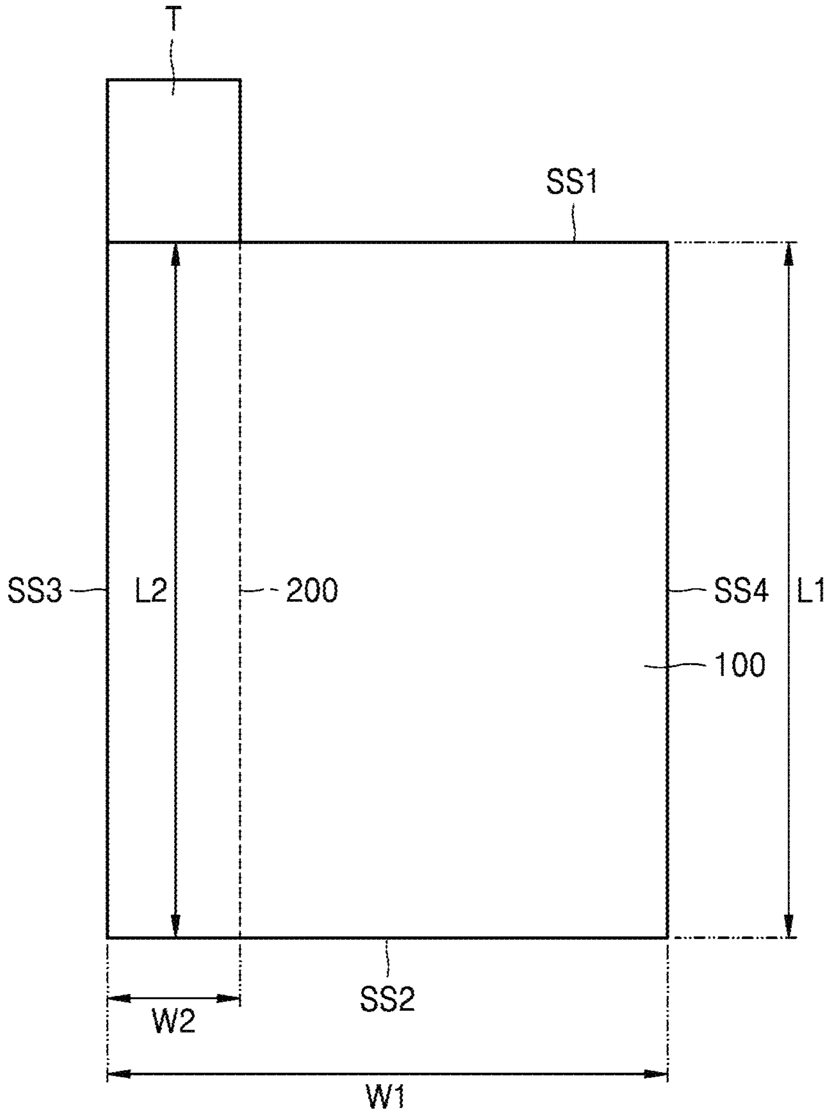

Referring to FIG. 7B, the electrode current collector 200 is exposed through the first side surface SS1, the second side surface SS2, and the third side surface SS3 of the electrode active material layer 100, and includes the tab T extending to the outside of the electrode active material layer 100 through the first side surface SS1. The second lengthwise distance L2 of the electrode current collector 200 may be 100% of the first lengthwise distance L1 of the electrode active material layer 100. The second widthwise distance W2 of the electrode current collector 200 may be less than 100% of the first widthwise distance W1 of the electrode active material layer 100.

Figure 7C:
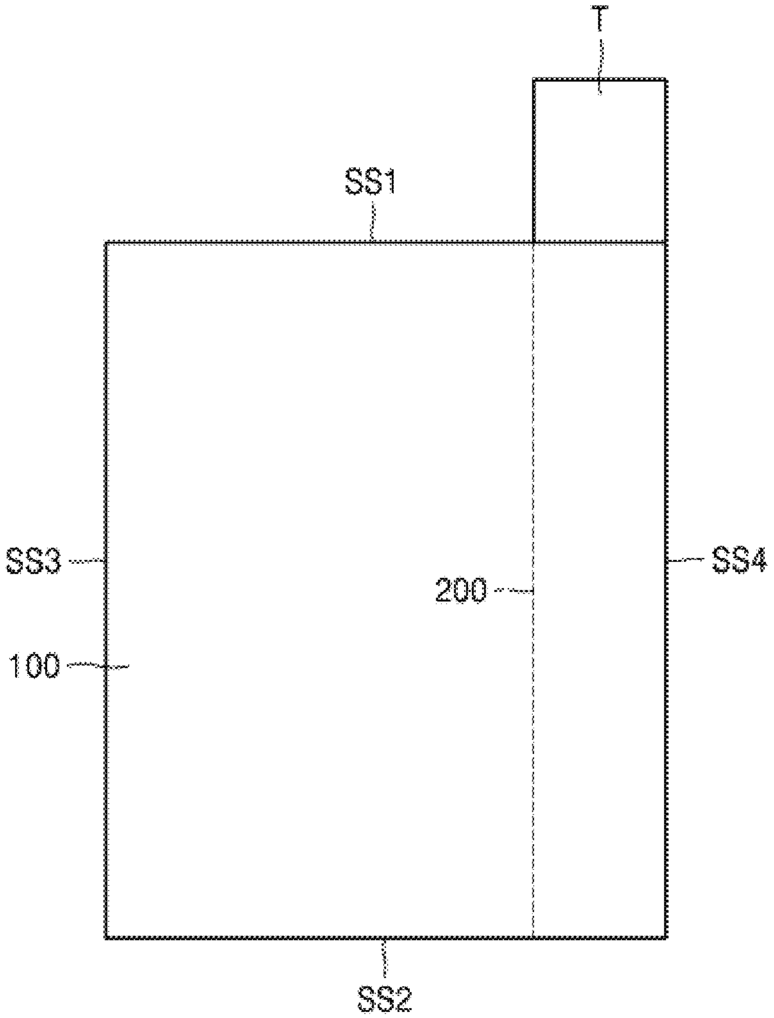

Referring to FIG. 7C, the electrode current collector 200 is exposed through the first side surface SS1, the second side surface SS2, and the fourth side surface SS4 of the electrode active material layer 100, and includes the tab T extending to the outside of the electrode active material layer 100 through the first side surface SS1.

Figure 7D:
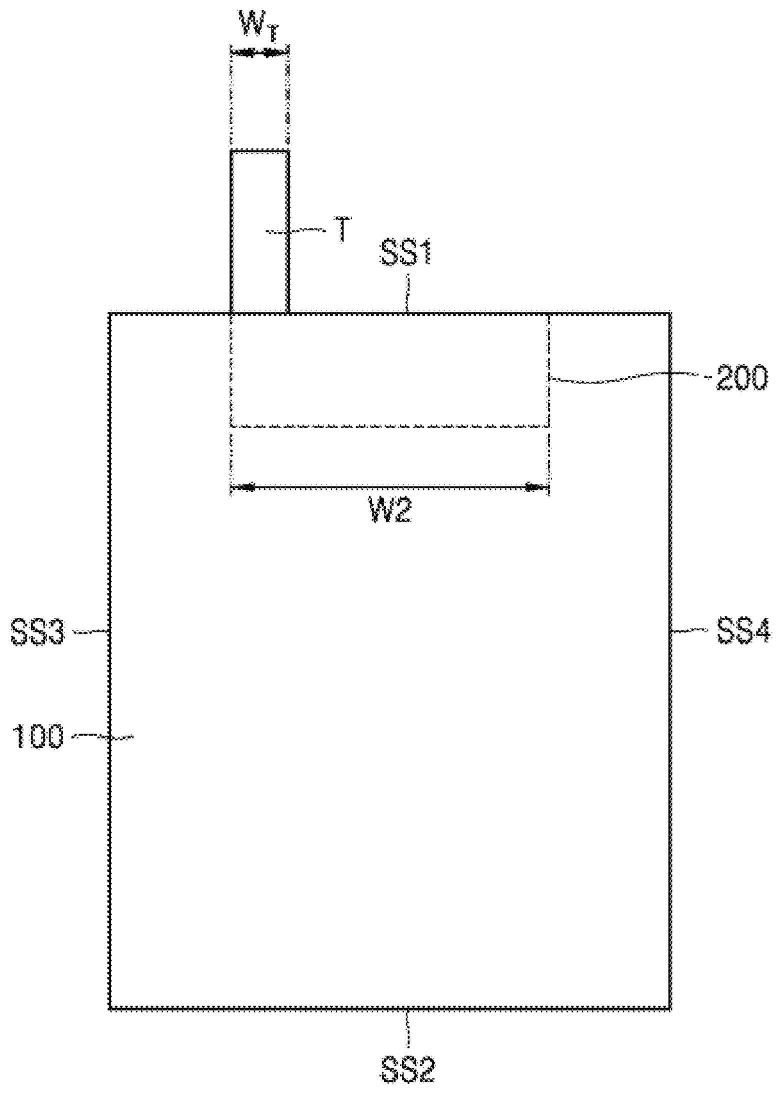

Referring to FIG. 7D, the electrode current collector 200 is exposed through the first side surface SS1 of the electrode active material layer 100, and includes the tab T extending to the outside of the electrode active material layer 100 through the first side surface SS1. The widthwise distance $W_T$ of the tab T may be less than 100% of the second widthwise distance W2 of the electrode current collector 200.

Figure 7E:
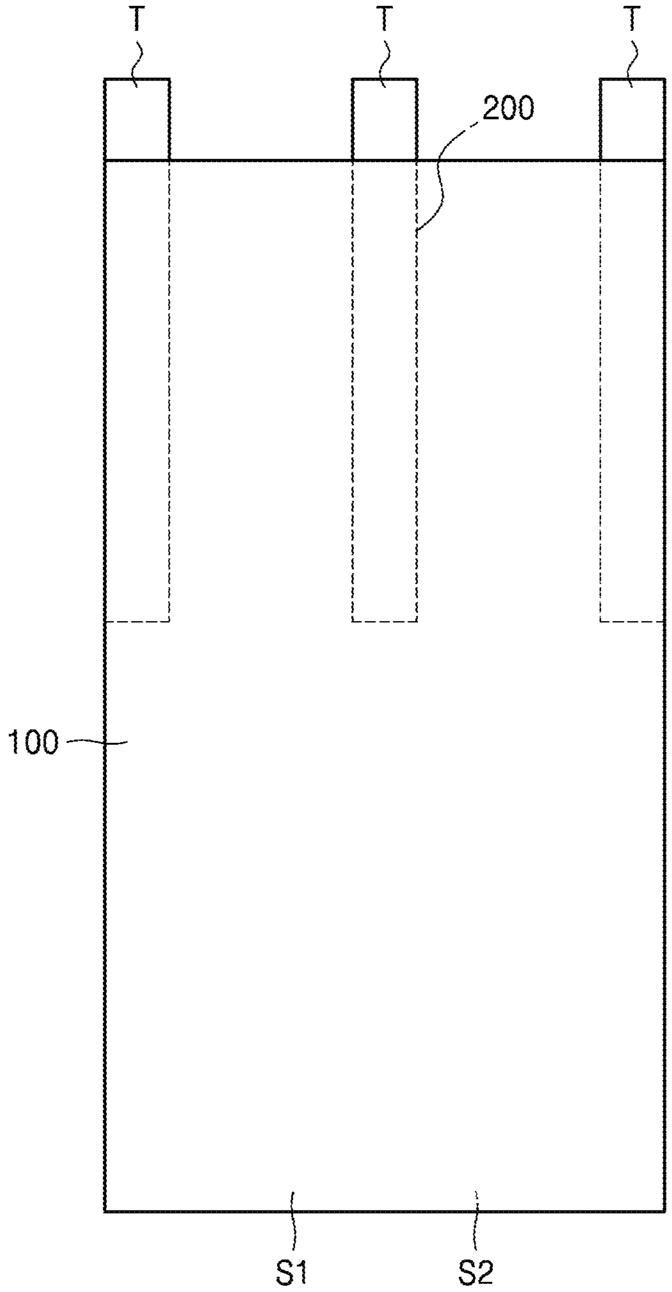
Figure 7F:
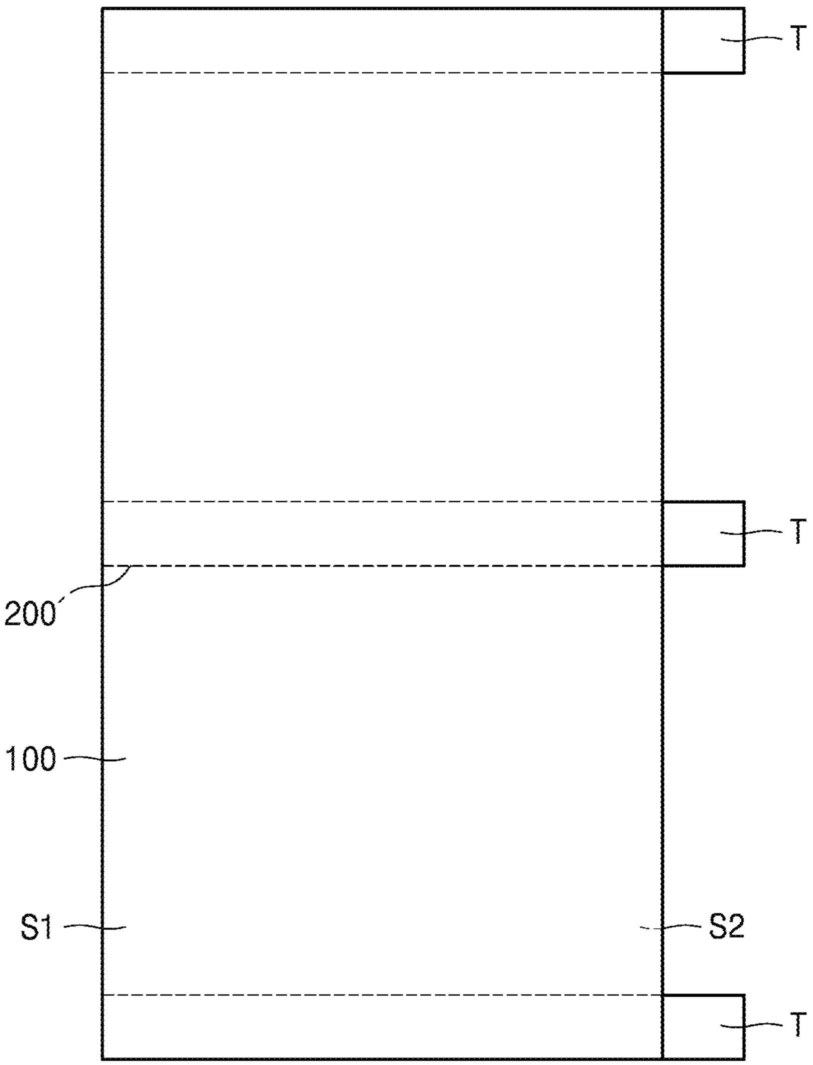

Referring to FIGS. 7E and 7F, included are a plurality of electrode current collectors 200 arranged spaced apart from each other in the length direction or width direction of the electrode active material layer 100. For example, the plurality of electrode current collectors 200 may be spaced apart at equal intervals or different intervals. The plurality of electrode current collector 200 may have an angle of 45 degrees or less, 40 degrees or less, 30 degrees or less, 25 degrees or less, 20 degrees or less, 15 degrees or less, 10 degrees or less, or 5 degrees or less, with respect to one surface of the electrode active material layer 100, for example, at least one of the first surface S1 and the second surface S2. For example, the plurality of electrode current collectors 200 may have an angle of 0 degree with respect to one surface of the electrode active material layer 100, e.g., may be arranged parallel (e.g., substantially parallel) to the electrode active material layer 100. For example, the plurality of electrode current collectors 200 may be between the first surface S1 and the second surface S2 of the electrode active material layer 100.

Figure 8:
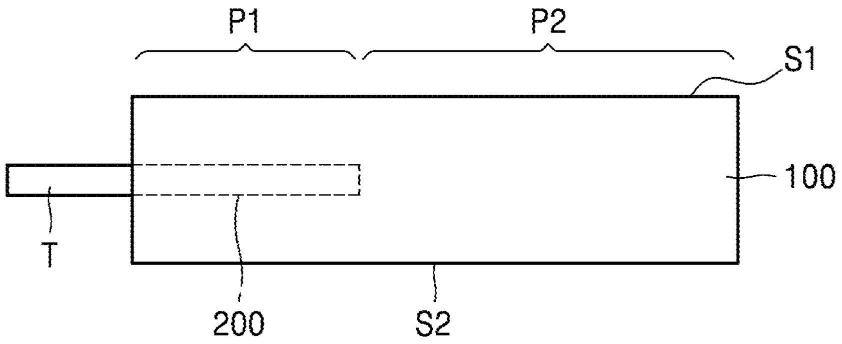
FIG. 8 is a cross-sectional view of an electrode according to an embodiment.

Referring to FIG. 8, the electrode active material layer 100 includes: a first region P1 in which the electrode current collector 200 is located between the first surface S1 and the second surface S2; and a second region P2 in which the electrode current collector 200 is not located between the first surface S1 and the second surface S2, wherein a mixture density of the second region P2 is different from a mixture density of the first region P1. For example, the mixture density of the second region P2 may be less than 100% of the mixture density of the first region P1. For example, the mixture density of the second region P2 may be about 50% to about 99.9%, about 60% to about 99%, about 70% to about 99%, about 80% to about 99%, about 80% to about 98%, about 80% to about 97%, about 80% to about 96%, or about 80% to about 95% of the mixture density of the first region P1.

According to another aspect of embodiments of the present disclosure, a lithium battery includes a cathode, an anode, and an electrolyte arranged between the cathode and the anode, wherein at least one of the cathode and the anode is the electrode described above.

Figure 9:
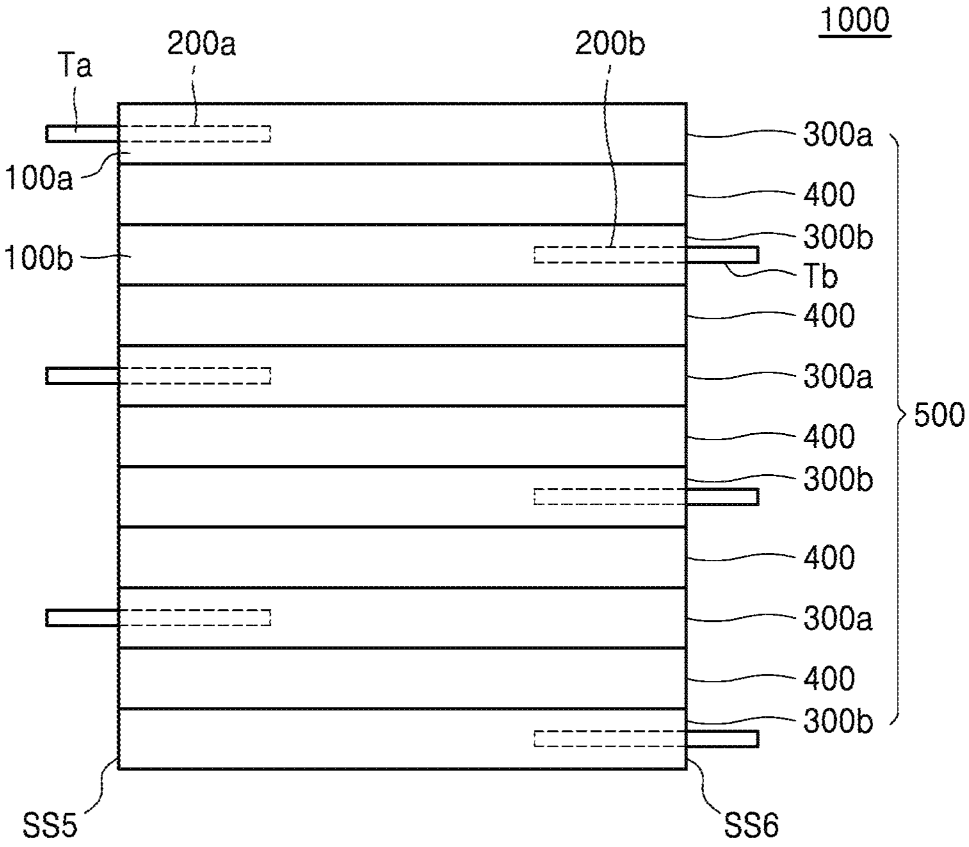
FIG. 9 is a side view of an electrode assembly according to an embodiment.
Figure 10:
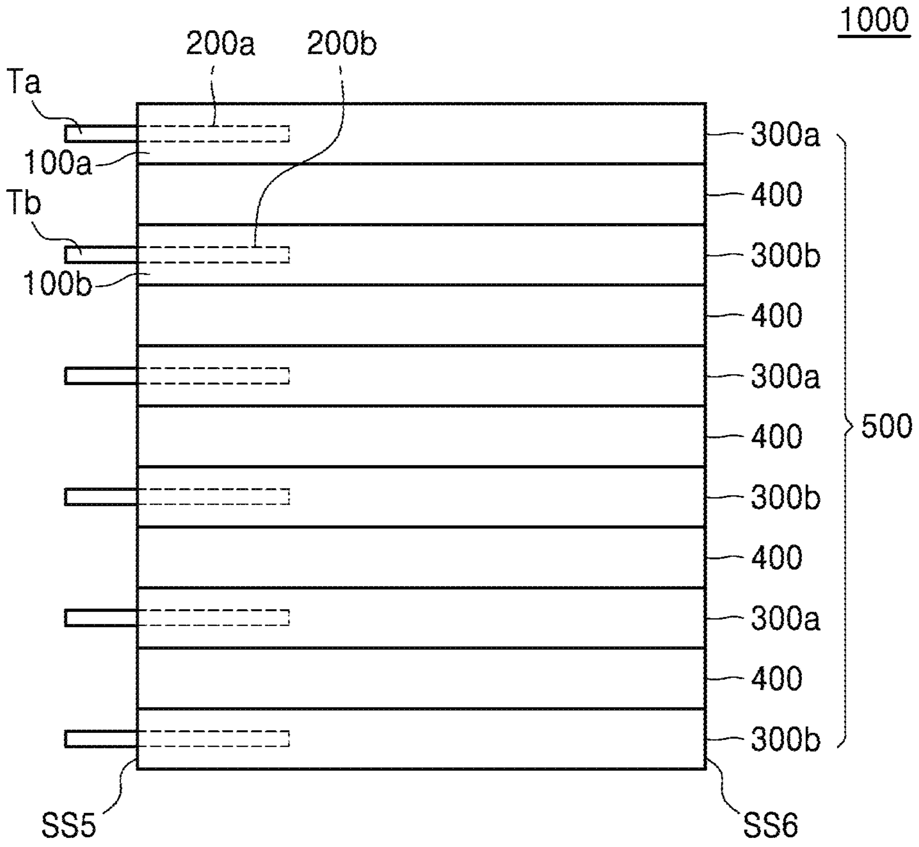
FIG. 10 is a side view of an electrode assembly according to an embodiment.
Figure 11:
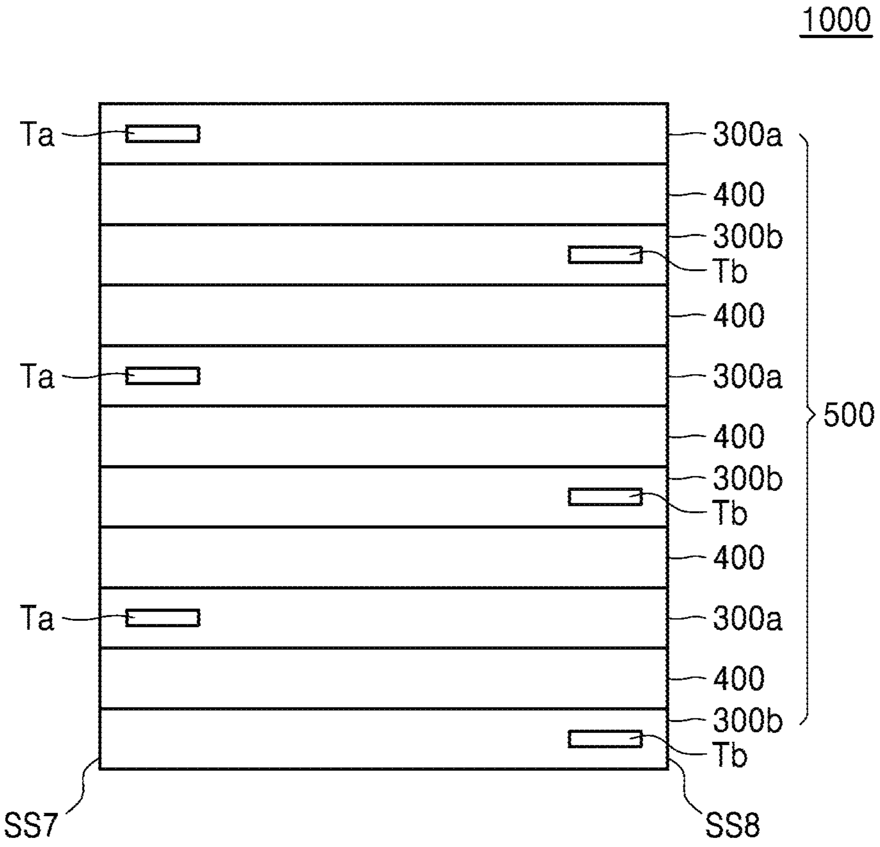
FIG. 11 is a front view of an electrode assembly according to an embodiment.

Referring to FIGS. 9 to 11, a lithium battery 1000 includes a cathode 300*a*, an anode 300*b*, and an electrolyte 400 between the cathode 300*a* and the anode 300*b*, wherein at least one of the cathode 300*a* and the anode 300*b* is the electrode described above.

Referring to FIG. 9, an electrode assembly 500 includes a plurality of cathodes 300*a* stacked along a thickness direction, a plurality of anodes 300*b* each located between neighboring cathodes 300*a*, and a plurality of electrolytes 400, each between the cathodes 300*a* and the anodes 300*b*. The cathode 300*a* includes a cathode current collector 200*a*, the cathode current collector 200*a* includes a cathode tab Ta extending to the outside of the cathode active material layer 100*a* through one side surface SS5 of the electrode assembly 500, and the anode 300*b* includes an anode current collector 200*b*, and the anode current collector 200*b* includes an anode tab Tb extending to the outside of the anode active material layer 100*b* through another side surface SS6 that is opposite to the one side surface SS5 of the electrode assembly 500. The lithium battery 1000 includes an electrode assembly 500. Because the cathode tab Ta and the anode tab Tb are on the side surfaces that are opposite to each other, the possibility of a short circuit therebetween is reduced.

Referring to FIG. 10, an electrode assembly 500 includes a plurality of cathodes 300*a* stacked along the thickness direction thereof, a plurality of anodes 300*b* each located between neighboring cathodes 300*a*, and a plurality of electrolytes 400, each between the cathodes 300*a* and the anodes 300*b*. The cathode 300*a* includes a cathode current collector 200*a*, the cathode current collector 200*a* includes a cathode tab Ta extending to the outside of the cathode active material layer 100*a* through one side surface SS5 of the electrode assembly 500, the anode 300*b* includes an anode current collector 200*b*, and the anode current collector 200*b* includes an anode tab Tb extending to the outside of the anode active material layer 100*b* through the one side surface SS5 of the electrode assembly 500. The lithium battery 1000 includes the electrode assembly 500.

Referring to FIG. 11, on the one side surface of the electrode assembly 500, a plurality of cathode tabs Ta are located spaced apart at constant (e.g., substantially constant) intervals in the thickness direction, and a plurality of anode tabs Tb are located spaced apart at constant (e.g., substantially constant) intervals in the thickness direction. The plurality of cathode tabs Ta are adjacent to one side surface SS7 of the electrode assembly 500 in the width direction thereof, and the plurality of anode tabs Tb are adjacent to the other side surface SS8 of the electrode assembly 500 in the width direction thereof. FIG. 11 is a front view of the one side surface SS5 in FIG. 10. The lithium battery 1000 includes the electrode assembly 500.

Although the cathode tab Ta and the anode tab Tb are on the same side, because they are spaced apart from each other in the width direction, the possibility of a short circuit therebetween is reduced.

The lithium battery 1000 may be, for example, a lithium ion battery, a lithium solid battery, a lithium air battery, and/or the like.

According to another embodiment, provided is an electrode manufacturing method according to an embodiment.

The electrode manufacturing method according to an embodiment may include: preparing at least two mixtures by dry mixing an electrode active material, a dry conductive material, and a dry binder; providing an electrode current collector having an interlayer arranged on one surface or two surfaces thereof; and simultaneously or sequentially providing the at least two mixtures on one surface or two surfaces of the electrode current collector and pressing the same to thereby manufacture an electrode having an electrode active material layer arranged on the one surface or two surfaces of the electrode current collector, wherein: the electrode active material layer includes a first electrode active material layer including a first electrode active material, and a second electrode active material layer including a second electrode active material; wherein the first electrode active material layer has, as measured by a surface and interfacial cutting analysis system (SAICAS), a first ratio of change of vertical relative force ($F_{VR}$) between a first point, which is 5% away (a first distance 5% away) from a surface of the first electrode active material layer facing away from the electrode current collector, and a second point, which is 5% away (a second distance 5% away) from a surface of the electrode current collector with respect to a total thickness of first electrode active material layer; the second electrode active material layer has, as measured by the SAICAS, a second ratio of change of vertical relative force ($F_{VR}$) between a third point, which is 5% away (a third distance 5% away) from a surface of the second electrode active material layer facing away from the first electrode active material layer, and a fourth point, which is 5% away (a fourth distance 5% away) from the surface of the first electrode active material layer with respect to the total thickness of the second electrode active material layer, and the second change ratio of the second electrode active material layer is 300% or less. An electrode manufactured by the manufacturing method may have a binding strength distribution having improved uniformity, and due to the improved binding strength between the electrode active material layer and the electrode current collector, the performance of a lithium battery using the electrode may be further improved.

First, at least two mixtures are prepared by dry mixing an electrode active material, a dry conductive material, and a dry binder. For example, a first mixture in which a first electrode active material, a dry conductive agent, and a dry binder are dry-mixed, and a second mixture in which a second electrode active material, a dry conductive agent, and a dry binder are dry-mixed, are separately prepared.

The dry mixing refers to mixing without a process solvent. The process solvent may be, for example, a solvent used in the preparation of electrode slurry. The process solvent may be, for example, water, NMP, etc., but is not limited thereto, and any suitable process solvent that is used in the preparation of electrode slurry may be used without limitation. The dry mixing may be performed using a stirrer at a temperature of 25° C. to 65° C. at a rotation speed of 10 rpm to 10000 rpm, or 100 rpm to 10000 rpm. The dry mixing may be performed using a stirrer for 1 to 200 min, or 1 to 150 min.

The dry mixing may be performed, for example, one or more times. First, a first mixture may be prepared by first dry-mixing of an electrode active material, a dry conductive material, and a dry binder. The first dry mixing may be performed at a temperature of about 25° C. to about 65° C. at a rotation speed of about 2000 rpm or less for about 15 minutes or less. The first dry mixing may be performed at a temperature of about 25° C. to about 65° C., and at a rotation speed of about 500 rpm to about 2000 rpm for about 5 minutes to about 15 minutes. Through the first dry mixing, the electrode active material, the dry conductive material and the dry binder may be uniformly (e.g., substantially uniformly) mixed. Subsequently, a second mixture may be prepared by second dry-mixing of an electrode active material, a dry conductive material, and a dry binder. The second dry mixing may be performed at a temperature of about 25° C. to about 65° C. at a rotation speed of about 4000 rpm or more for about 10 minutes or more. The second dry mixing may be performed at a temperature of about 25° C. to about 65° C. at a rotation speed of about 4000 rpm to about 9000 rpm for about 10 minutes to about 60 minutes. Through the second dry mixing, a dry mixture including a fibrillated (fibrillized) dry binder may be obtained.

The stirrer may be, for example, a kneader. The stirrer may include: a chamber; at least one rotary shaft that rotates inside the chamber; and a blade rotatably coupled to the rotary shaft in the lengthwise direction of the rotary shaft. The blade may be, for example, one or more selected from a ribbon blade, a sigma blade, a jet (Z) blade, a dispersion blade, and a screw blade. Due to the inclusion of the blade, the electrode active material, the dry conductive material, and the dry binder may be effectively mixed without a solvent, to prepare a dough-like mixture. The prepared mixture may be introduced into an extrusion device and extruded in the form of a sheet. The pressure during the extrusion may be, for example, about 4 MPa to about 100 MPa, or about 10 MPa to about 90 MPa. The obtained mixture may be in the form of a sheet. For example, the obtained mixture may be an electrode active material layer.

As the dry conductive material, carbon black, graphite fine particles, natural graphite, artificial graphite, acetylene black, ketjen black, carbon fiber; carbon nanotubes; metal powder, metal fiber and/or metal tube of copper, nickel, aluminum, and/or silver; and/or a conductive polymer such as polyphenylene derivatives may be used. However, the present disclosure is not limited thereto, and any suitable conductive material used in the art may be used. The conductive material may be, for example, a carbonaceous conductive material.

As the dry binder, a vinylidene fluoride/hexafluoropropylene copolymer, polyvinylidene fluoride, polyacrylonitrile, polymethyl methacrylate, polytetrafluoroethylene (PTFE), a mixture of these polymers, and/or styrene butadiene rubber-based polymer may be used.

A plasticizer or a pore-forming agent may be further added to the electrode active material composition to form pores in an electrode plate.

The amounts of the electrode active material, the dry conductive material, and the dry binder used in the electrode active material layer may be at any suitable levels generally used in lithium batteries.

The cathode uses a cathode active material as the electrode active material. For the cathode active material, the description of the electrode provided above may be referred to. The anode uses an anode active material as the electrode active material. For the anode active material, the description of the electrode provided above may be referred to.

Next, an electrode current collector in which an interlayer is on one surface or two surfaces thereof is provided.

The providing of the electrode current collector in which the interlayer is on one surface or two surfaces thereof may include, for example, providing the electrode current collector and providing the interlayer on one surface or two surfaces of the electrode current collector.

For a material of the electrode current collector, the description of the electrode current collector provided above may be referred to. The cathode current collector may be, for example, aluminum foil. The anode current collector may be, for example, copper foil.

The providing of the interlayer on one surface or two surfaces of the electrode current collector may include providing the interlayer on one surface or two surfaces of the electrode current collector by a dry or wet method. The dry coating may include, for example, coating a carbonaceous conductive material and/or a precursor thereof on one surface or two surfaces of the electrode current collector by deposition and/or the like. The deposition may be performed at a temperature ranging from room temperature to high temperature under normal pressure or a vacuum. When the interlayer located by dry coating includes (or consists of) a carbonaceous material, a binder may not be included. The wet coating may include for example, coating a composition containing a carbonaceous conductive material and a binder, on one surface or two surfaces of the electrode current collector. The composition may include, for example, a carbonaceous conductive material, a binder, and a process solvent. For the carbonaceous conductive material and the binder, the description of the electrode provided above may be referred to. The process solvent may be selected from the solvents used in the preparation of the electrode slurry. The process solvent is removed by drying after the composition is coated on the electrode current collector. The coating method is not limited to spin coating, dip coating, and the like, and any suitable coating method used in the art may be used.

Next, the at least two mixtures are simultaneously or sequentially placed on one surface or two surfaces of the electrode current collector, and pressed to manufacture an electrode having an electrode active material layer on the one surface or two surfaces of the electrode current collector.

For example, a first mixture and a second mixture, in a sheet form, may be sequentially or simultaneously arranged on one surface of the electrode current collector, and then pressed to manufacture an electrode of a structure as shown in FIG. 2.

In other embodiments, a first mixture and a second mixture, in a sheet form, may be sequentially or simultaneously arranged on two surfaces of the electrode current collector, and then pressed to manufacture an electrode of a structure as shown in FIG. 1.

The pressing may be, for example, roll pressing, plate pressing, and/or the like, but embodiments are not limited thereto. A pressure during the pressing may be, for example, 1.0 ton·f/cm$^2$ to 10.0 ton·f/cm$^2$. When the pressure during the pressing is excessively increased, the thin-film electrode current collector may crack. When the pressure during the pressing is too low, the binding strength between the electrode current collector and the electrode active material layer may be weak.

The lithium battery may be manufactured by, for example, a following method provided as an example, but the present disclosure is not necessarily limited to this method, and variations are possible according to required conditions.

First, one or both of the cathode and the anode may be manufactured according to the electrode manufacturing method described above. In other embodiments, when one electrode of the cathode and the anode is manufactured by the electrode manufacturing method described above, the other electrode may be manufactured by a wet manufacturing method. For example, the other electrode may be manufactured by preparing an electrode slurry including an electrode active material, a conductive material, a binder, and a solvent, coating the prepared electrode slurry on an electrode current collector, and drying the electrode slurry. The conductive material and the binder included in an electrode which is manufactured by a wet method may be selected from conductive materials and binders that are used in the manufacture of an electrode by a dry method.

Next, a separator to be inserted between the cathode and the anode is prepared.

The separator may be any suitable separator that is generally used in lithium batteries. As the separator, for example, a separator having low resistance to the ion movement of an electrolyte and an excellent electrolyte impregnating ability is used. The separator, which is selected from fiberglass, polyester, Teflon, polyethylene, polypropylene, polytetrafluoroethylene (PTFE), and a combination thereof, may be in the form of non-woven fabric and/or woven fabric. A lithium ion battery may use, for example, a separator that can be wound up, such as polyethylene, polypropylene, and/or the like, and a lithium ion polymer battery may use a separator which is excellent in terms of its ability to be impregnated with an organic electrolyte.

The separator may be manufactured by a following example method, but the present disclosure is not necessarily limited thereto, adjustment is possible according to required conditions.

First, a polymer resin, a filler, and a solvent are mixed to prepare a separator composition. The separator composition is directly coated on an electrode and dried to form a separator. In other embodiments, after the separator composition is cast on a support and dried to form a separator film, the separator film may be separated from the support and laminated on an electrode to form a separator.

The polymer used for manufacturing the separator is not particularly limited, and any suitable polymer used for a binder of an electrode may be used. For example, the polymer may be a vinylidene fluoride/hexafluoropropylene copolymer, polyvinylidene fluoride (PVDF), polyacrylonitrile, polymethyl methacrylate, or a mixture thereof.

Next, an electrolyte is prepared.

The electrolyte may be, for example, an organic liquid electrolyte. For example, the organic liquid electrolyte may be prepared by dissolving a lithium salt in an organic solvent.

The organic solvent may be any suitable organic solvent used in the art. The organic solvent may include, for example, propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene, diethylene glycol, dimethyl ether, or a mixture thereof.

The lithium salt may be any suitable lithium salt used in the art. The lithium salt may be, for example, $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are natural numbers greater than 0), LiCl, LiI, or a mixture thereof.

In other embodiments, the electrolyte may be a solid electrolyte. The solid electrolyte may be, for example, boron oxide, lithium oxynitride, and/or the like, but is not limited thereto, and any suitable solid electrolyte used in the art may be used. The solid electrolyte may be formed on the anode by, for example, sputtering, and/or a separate solid electrolyte sheet may be stacked on the anode. The solid electrolyte may be, for example, an oxide-based solid electrolyte or a sulfide-based solid electrolyte.

Figure 12:
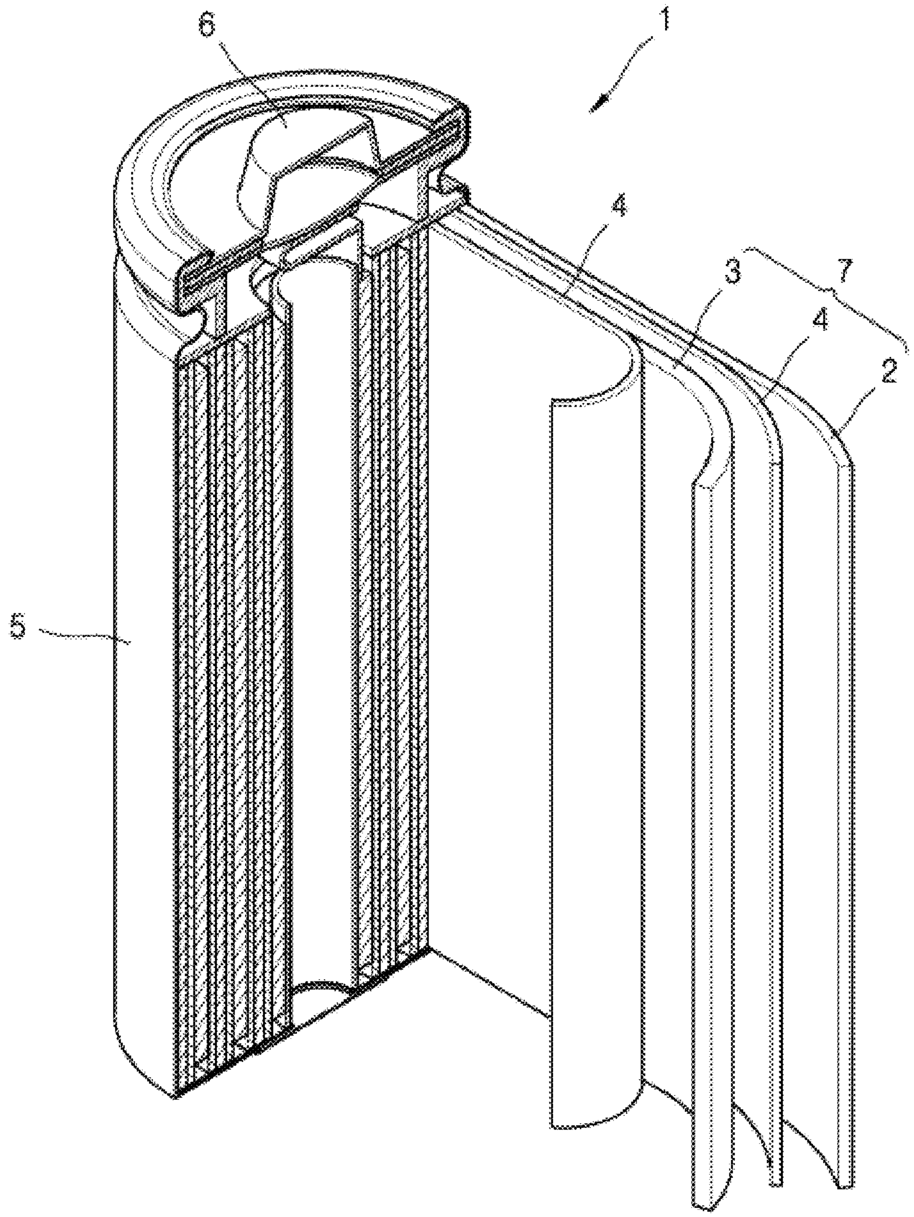
FIG. 12 is a perspective schematic view of a lithium battery according to an embodiment.

Referring to FIG. 12, a lithium battery 1 includes a cathode 3, an anode 2, and a separator 4. The cathode 3, the anode 2, and the separator 4 may be wound up or folded to form a battery assembly 7. The formed battery assembly 7 is accommodated in a battery case 5. An organic liquid electrolyte is injected into the battery case 5 and sealed with a cap assembly 6 to complete the manufacture of the lithium battery 1. The battery case 5 may be cylindrical, but is not limited to this form, and may have, for example, a prismatic or thin-film form.

Figure 13:
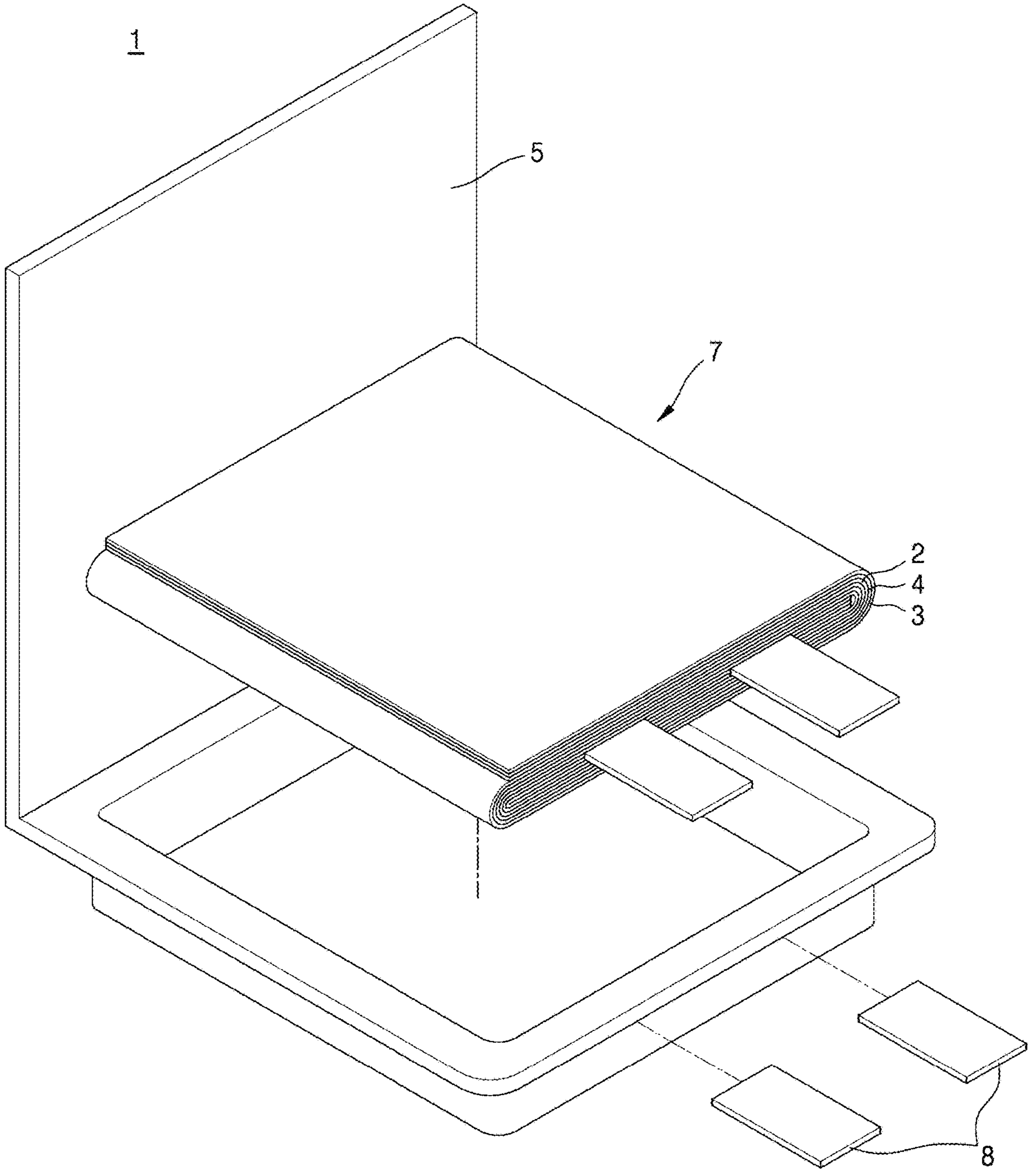
FIG. 13 is a perspective, exploded, schematic view of a lithium battery.

Referring to FIG. 13, a lithium battery 1 includes a cathode 3, an anode 2, and a separator 4. The separator 4 is arranged between the cathode 3 and the anode 2, and the cathode 3, the separator 4, and anode 2 are wound up or folded to form a battery assembly 7. The formed battery assembly 7 is accommodated in a battery case 5. An electrode tab 8, which serves as an electrical pathway for externally inducing a current generated in the battery assembly, may be included. An organic liquid electrolyte is injected into the battery case 5 and sealed to complete the manufacture of the lithium battery 1. The battery case 5 may be prismatic, but is not limited to this form, and may have, for example, a cylindrical or thin-film form.

Figure 14:
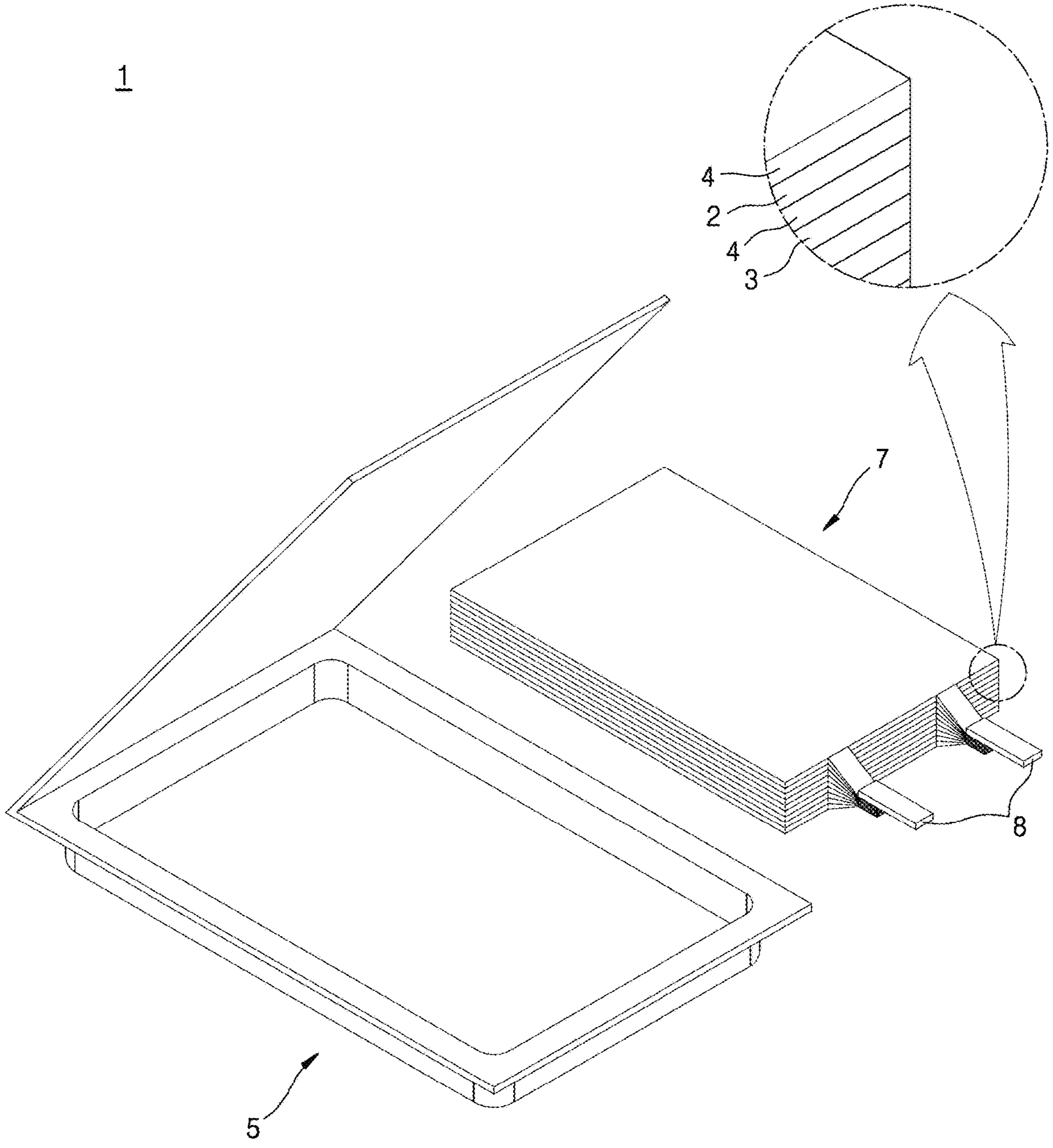
FIG. 14 is a perspective, exploded, schematic view of a lithium battery.

Referring to FIG. 14, a lithium battery 1 includes a cathode 3, an anode 2, and a separator 4. The separator 4 is arranged between the cathode 3 and the anode 2 to form a battery assembly 7. The battery assembly 7 is stacked in a bi-cell structure, and then accommodated in the battery case 5. An electrode tab 8, which serves as an electrical pathway for externally inducing a current generated in the battery assembly, may be included. An organic liquid electrolyte is injected into the battery case 5 and sealed to complete the manufacture of the lithium battery 1. The battery case 5 may be prismatic, but is not limited to this form, and may have, for example, a cylindrical or thin-film form.

A pouch-type lithium battery is a lithium battery using a pouch, instead of the battery case used in the lithium battery of FIGS. 12 to 14. The pouch-type lithium battery includes one or more battery assemblies. The separator is arranged between the cathode and the anode to form a battery assembly. The battery assembly is stacked in a bi-cell structure and then impregnated with an organic liquid electrolyte. Then, the resulting structure is put into a pouch and sealed to complete the manufacture of a pouch-type lithium battery. For example, in some embodiments, after the cathode, the separator, and the anode described above are simply stacked as an electrode assembly or are wound up or folded as an electrode assembly in a jelly roll form, the electrode assembly is accommodated in a pouch. Subsequently, an organic liquid electrolyte is injected into the pouch and sealed to complete the manufacture of a lithium battery.

The lithium battery may have improved lifespan characteristics and high-rate characteristics, and thus, may be used in an electric vehicle (EV), for example, in a hybrid vehicle such as a plug-in hybrid electric vehicle (PHEV). In addition, the lithium battery may be used in fields in which storage of a large amount of power is required or desired. For example, the lithium battery may be used in an electric bicycle and/or a power tool.

A plurality of lithium batteries may be stacked to form a battery module, and a plurality of battery modules form a battery pack. The battery pack may be used in any suitable device which requires high capacity and high output, for example, in a laptop computer, a smart phone, an electric vehicle, and/or the like. For example, a battery module may include a plurality of batteries and a frame for holding the batteries. For example, a battery pack may include a plurality of battery modules and a busbar which connect or couple the battery modules. The battery module and/or the battery pack may further include a cooling device. A plurality of battery packs are controlled by a battery management system. The battery management system includes battery packs and a battery control device connected to or coupled to the battery packs.

One or more embodiments of the disclosure will now be described in more detail with reference to the following examples. However, these examples are only for illustrative purposes and are not intended to limit the scope of the one or more embodiments of the disclosure.

Preparation of Composite

Preparation Example 1: $Al_2O_3$@Gr Composite $Al_2O_3$ particles (average particle diameter: about 15 nm) were placed in a reactor, and then, $CH_4$ was supplied into the reactor at about 300 sccm at 1 atm for about 30 minutes, and the inner temperature of the reactor was raised to 1000° C.

Then, heat treatment was performed while maintaining the temperature for 7 hours. Then, the inner temperature of the reactor was adjusted to room temperature (20° C. to 25° C.) to obtain a composite in which $Al_2O_3$ particles and a reduction product thereof, $Al_2O_z$ ($0<z<3$) particles, were embedded in graphene.

The amount of graphene contained in the composite was 30.9 wt %.

Preparation Example 2: $SiO_2$@Gr Composite $SiO_2$ particles (average particle diameter: about 15 nm) were placed in a reactor, and then, $CH_4$ was supplied into the reactor at about 300 sccm at 1 atm for about 30 minutes, and the inner temperature of the reactor was raised to 1000° C.

Then, heat treatment was performed while maintaining the temperature for 7 hours. Then, the inner temperature of the reactor was adjusted to room temperature (20° C. to 25° C.) to obtain a composite in which $SiO_2$ particles and a reduction product thereof, $Si_2O_y$ ($0<y<2$) particles, were embedded in graphene.

(Confirmation of Whether Composite was Prepared)

An X-ray photoelectron spectroscopy (XPS) spectrum of the composite of Preparation Example 1 with time during the preparation was measured using a Quantum 2000 (Physical Electronics). The XPS spectra of C 1s orbital and Al 2p orbital with respect to the sample were measured before temperature increasing, and after 1 minute, 5 minutes, 30 minutes, 1 hour, and 4 hours from the temperature increasing. At an early temperature increasing stage, only a peak for Al 2p orbital appeared, and a peak for C 1s orbital did not appear. After 30 minutes passed, the peak for C 1s orbital appeared clearly, and the size of the peak for Al 2p orbital was significantly reduced.

After 30 minutes passed, the peak for C 1s orbital, due to a C—C bond and a C═C bond from the growth of graphene, appeared clearly at around 284.5 eV.

As the reaction time passed, the oxidation number of aluminum was decreased, and thus, the position of the peak for Al 2p orbital was shifted toward lower binding energy (eV).

Therefore, it was confirmed that, as the reaction proceeded, graphene grew on the $Al_2O_3$ particles, and $Al_2O_x$ ($0<x<3$), a reduction product of $Al_2O_3$, was formed.

The average amounts of carbon and aluminum in 10 areas of the composite sample prepared in Preparation Example 1 were measured from the XPS analysis results. From the measurement results, the deviation of the amount of aluminum in each area was calculated. The deviation in the amount of aluminum was expressed as a percentage with respect to the average value, and referred to as uniformity. The percentage of the deviation in the aluminum amount with respect to the average value, that is, the uniformity of the aluminum amount was 1%. Therefore, it was confirmed that alumina was uniformly distributed in the composite prepared in Preparation Example 1.

Preparation of Composite Cathode Active Material

Manufacturing Example 1: $Al_2O_3$@Gr Composite 0.25 wt % Coating NCA91

$LiNi_{0.91}Co_{0.05}Al_{0.04}O_2$ (hereinafter, referred to as NCA91) and the composite prepared in Preparation Example 1 were milled using a Nobilta Mixer (Hosokawa, Japan) at a rotation speed of about 1000 rpm to about 2000 rpm for about 5 minutes to 30 minutes to obtain a composite cathode active material.

A mixing weight ratio of NCA91 and the composite obtained according to Preparation Example 1 was 99.75:0.25.

Manufacturing Example 2: $Al_2O_3$@Gr Composite 0.4 wt % Coating NCA91

A composite cathode active material was prepared in substantially the same manner as in Manufacturing Example 1, except that the mixing weight ratio of NCA91 and the composite obtained according to Preparation Example 1 was changed to 99.6:0.4.

Manufacturing Example 3: $Al_2O_3$@Gr Composite 1.0 wt % Coating NCA91

A composite cathode active material was prepared in substantially the same manner as in Manufacturing Example 1, except that the mixing weight ratio of NCA91 and the composite obtained according to Preparation Example 1 was changed to 99.0:1.0.

Manufacturing Example 4: $SiO_2$@Gr Composite 0.4 wt % Coating NCA91

A composite cathode active material was prepared in substantially the same manner as in Preparation Example 2, except that $SiO_2$@Gr composite prepared in Preparation Example 2, instead of $Al_2O_3$@Gr composite prepared in Preparation Example 1, was used.

Confirmation of Whether Composite Cathode Active Material was Prepared

The composite prepared in Preparation Example 1, the composite cathode active material prepared in Manufacturing Example 2, and bare NCA91 not coated with the composite were analyzed by scanning electron microscopy (SEM), high-resolution transmission electron microscopy, and energy dispersive X-ray analysis (EDX). For SEM-EDAX analysis, a FEI Titan 80-300 (Philips Co.) was used.

It was found that the composite prepared in Preparation Example 1 had a structure in which $Al_2O_3$ particles and a reduction product thereof, $Al_2O_z$ ($0<z<3$) particles, were embedded in graphene. It was confirmed that the graphene layer was on the border of at least one selected from $Al_2O_3$ particles and $Al_2O_z$ particles ($0<z<3$). The particles of at least one selected from $Al_2O_3$ particles and $Al_2O_z$ particles ($0<z<3$) were uniformly distributed in the graphene matrix. At least one selected from $Al_2O_3$ particles and $Al_2O_z$ ($0<z<3$) particles had a particle diameter of about 15 nm. The composite prepared in Preparation Example 1 had a particle diameter of about 100 nm to about 200 nm.

It was confirmed that, in the composite cathode active material prepared in Manufacturing Example 2, a shell formed of the graphene-containing composite was on the NCA91 core.

Bare NCA91 not coated with the composite and the composite cathode active material prepared in Manufacturing Example 2 were analyzed by SEM-EDAX analysis.

It was confirmed that the concentration of aluminum (Al) distributed on the surface of the composite cathode active material of Manufacturing Example 2 increased compared to the surface of the bare NCA91 composite cathode active material which is not coated with the composite. Therefore, it was confirmed that in the composite cathode active material of Manufacturing Example 2, the composite prepared in Preparation Example 1 was uniformly coated on the NCA91 core to form a shell.

Manufacture of Lithium Battery (Half-Cell)

Example 1

Manufacture of Cathode $LiFePO_4$ (hereinafter, referred to as LFP) as a first cathode active material, a carbon conductive agent (Denka Black), and polyvinylidene fluoride (PVdF) were dry-mixed to a weight ratio of 92:4:4 with a blade mixer at a speed of 1000 rpm for 10 minutes to prepare a first mixture in which the active material, the conductive agent, and the binder were uniformly mixed. Then, in order to allow the binder to be fibrillated (fibrillized), second mixing was additionally performed with the blade mixer at a rotation speed of 5000 rpm for 20 minutes to prepare a second mixture. A separate solvent was not used in the preparation of the first mixture and the second mixture.

$LiNi_{0.91}Co_{0.05}Al_{0.04}O_2$ (hereinafter, referred to as NCA91) as a second cathode active material, a carbon conductive agent (Denka Black), and polyvinylidene fluoride (PVdF) were dry-mixed to a weight ratio of 92:4:4 in substantially the same manner as used for the first mixture, to prepare a third mixture. Then, in order to allow the binder to be fibrillated (fibrillized), second mixing was additionally performed with the blade mixer at a rotation speed of 5000 rpm for 20 minutes to prepare a fourth mixture. A separate solvent was not used in the preparation of the third mixture and the fourth mixture.

The prepared second mixture was put into an extruder and extruded to prepare a first cathode active material layer as a self-standing film in a sheet form. A pressure during the extrusion was 60 MPa.

The prepared fourth mixture was put into an extruder and extruded to prepare a second cathode active material layer as a self-standing film in a sheet form. A pressure during the extrusion was 55 MPa.

A cathode current collector having a carbon layer coated on two surfaces of an aluminum thin film having a thickness of 13.5 μm was prepared.

The carbon layer was prepared by coating and drying a composition including a carbon conductive material (Denka Black) and polyvinylidene fluoride (PVdF). The carbon layer, which was on one surface of the cathode current collector, had a thickness of about 1 μm.

The first cathode active material layer self-standing film and the second cathode active material layer self-standing film were sequentially arranged on one surface of a cathode current collector. Subsequently, the first cathode active material layer self-standing film and the second cathode active material layer self-standing film were sequentially arranged on the other surface of the cathode current collector. Then, the two surfaces of the cathode current collector were pressed to manufacture a dry cathode. A pressure during the pressing was 60 MPa.

The thicknesses of the first cathode active material layer and the second cathode active material layer, on one surface of the cathode current collector of the dry cathode, were 15 um and 20 um, respectively, and the thickness of the entire cathode active material layers on one surface of the cathode current collector was 35 um.

The thickness of the entire cathode active material layers on two surfaces of the cathode current collector was 70 um.

Manufacture of Coin Cell

Using the cathode prepared above, a coin cell was manufactured, in which lithium metal as a counter electrode, a PTFE separator, and an electrolyte as a solution of 1.3 M $LiPF_6$ dissolved in a 3:4:4 (by volume) mixture of ethylene carbonate (EC), ethylmethylcarbonate (EMC), and dimethyl carbonate (DMC) were used.

Example 2

A dry cathode and a coin cell were manufactured in substantially the same manner as in Example 1, except that when preparing the second mixture and the fourth mixture, to allow fibrillation of the binder to progress, additional second mixing was performed with a blade mixer at a speed of 5000 rpm for 10 minutes to prepare the second mixture and the fourth mixture.

Example 3

A dry cathode and a coin cell were manufactured in substantially the same manner as in Example 1, except that when preparing the second mixture and the fourth mixture, to allow fibrillation of the binder to progress, additional second mixing was performed with a blade mixer at a speed of 5000 rpm for 30 minutes to prepare the second mixture and the fourth mixture.

Examples 4 to 7: Composite Coating Composite Cathode Active Material

Dry cathodes and coin cells were manufactured in substantially the same manner as in Example 1, except that the composite cathode active materials prepared in Manufacturing Examples 1 to 4 were used, respectively, as the second cathode active material.

Example 8

A dry cathode and a coin cell were manufactured in substantially the same manner as in Example 1, except that an aluminum mesh sheet instead of the aluminum foil was used as the cathode current collector.

Comparative Example 1

Manufacture of Cathode

A mixture of $LiNi_{0.91}Co_{0.05}Al_{0.04}O_2$ (hereinafter, referred to as NCA91) as a second cathode active material, a carbon conductive agent (Denka Black), and polyvinylidene fluoride (PVdF) in a weight ratio of 92:4:4 was mixed with N-methylpyrrolidone (NMP) with an agate mortar to prepare a slurry.

The slurry was bar-coated on one surface of an aluminum cathode current collector and dried at room temperature, and dried again in a vacuum at 120° C.° C. to introduce a cathode active material layer.

Subsequently, a cathode active material layer was introduced on the other surface of the aluminum cathode current collector to prepare a laminate. The prepared laminate was pressed to manufacture a cathode. A pressure during the pressing was 4.0 ton·f/$cm^2$.

Manufacture of Coin Cell

A coin cell was manufactured in substantially the same manner as in Example 1, except that the cathode manufactured above was used.

Comparative Example 2

A cathode was manufactured in substantially the same manner as in Example 1, except that an aluminum thin film having a thickness of 10 μm, not coated with a carbon layer, was used as the cathode current collector.

In the manufactured cathode, part of the cathode active material layer was delaminated from the cathode current collector, and thus, it was impossible to manufacture a coin cell.

Comparative Example 3

A dry cathode and a coin cell were manufactured in substantially the same manner as in Example 1, except that when preparing the second mixture and the fourth mixture, to allow fibrillation of the binder to progress, additional second mixing was performed with a blade mixer at a speed of 3000 rpm for 20 minutes to prepare the second mixture and the fourth mixture.

Evaluation Example 1: Evaluation of Vertical Force of Cathode Active Material Layer (I)

Binding characteristics of the cathode active material layer included in the cathodes manufactured in Examples 1 to 8 and Comparative Examples 1 to 3 were analyzed using a SAICAS (SAICAS EN-EX, Daipla Wintes, JAPAN).

The vertical force ($F_V$) according to depth was measured by performing constant velocity analysis by using a diamond blade having a width of 1 mm in the conditions of a clearance angle of 10°, a rake angle of 20°, a shearing angle of 45°, a horizontal velocity of 4 μm/s, and a vertical velocity of 0.4 μm/s.

First constant velocity analysis was performed from a first position on the surface of the second cathode active material layer, sequentially passing through the second cathode active material layer and the first cathode active material layer, to the surface of the cathode current collector, and the blade was moved horizontally along the surface of the cathode current collector to remove the cathode active material layer. Then, at a position 10 μm backward from the first position, second constant velocity analysis was performed in the same conditions as in the first constant velocity analysis. Data measured in the second constant velocity analysis was used.

A vertical force of the second cathode active material layer was measured from a section of the second cathode active material layer, and the measured data was normalized with a force graph area to derive a vertical relative force ($F_{VR}$) of the second cathode active material layer.

A vertical force of the first cathode active material layer was measured from a section of the first cathode active material layer, and the measured data was normalized with a force graph area to derive a vertical relative force ($F_{VR}$) of the first cathode active material layer.

To calculate a ratio of change of vertical relative force, the vertical relative force of the second cathode active material layer was measured using data derived from a section starting from a third point ending at a fourth point, wherein the third point is 5% away (a third distance 5% away) from a surface of the second cathode active material layer facing away from a surface of the first cathode active material layer, and the fourth point is 5% away (a fourth distance 5% away) from the surface of the first cathode active material layer with respect to the total thickness of the second cathode active material layer. To calculate a ratio of change of vertical relative force, the vertical relative force of the first cathode active material layer was measured using data derived from a section starting from a first point ending at a second point, wherein the first point is 5% away (a first distance 5% away) from a surface of the first cathode active material layer facing away from a surface of the electrode current collector, and the second point is 5% away (a second distance 5% away) from the surface of the electrode current collector with respect to the total thickness of the first cathode active material layer. That is, when calculating ratios of change of vertical relative force, vertical relative force data near the surface of the second cathode active material layer, the interface between the second cathode active material layer and the first cathode active material layer (e.g., one surface of the first cathode active material layer), and the surface of the electrode current collector were excluded to prevent or reduce a measurement error.

From the vertical relative force ($F_{VR}$) data of the second cathode material layer in the section from the third point to the fourth point, a ratio of change of vertical relative force ($F_{VR}$) of the second cathode active material layer was calculated using Equation 1. The same calculation was performed on the first cathode active material layer in the section from the first point to the second point. In addition, from the vertical relative force ($F_{VR}$) data of the second cathode active material layer in the section starting from the third point ending at the fourth point, an arithmetic mean value was calculated. The same calculation was performed on the first cathode active material layer in the section from the first point to the second point.

The ratio of change of vertical relative force ($F_{VR}$) of the second cathode active material layer was defined as a second ratio of change, and the arithmetic mean value of the vertical relative force ($F_{VR}$) of the second cathode active material layer was defined as a second mean value.

The ratio of change of vertical relative force ($F_{VR}$) of the first cathode active material layer was defined as a first ratio of change, and the arithmetic mean value of the vertical relative force ($F_{VR}$) of the first cathode active material layer was defined as a first mean value.

In the case of Comparative Example 1 having a single layer structure, the vertical relative force of the cathode active material layer was measured in the same manner as in the Examples, except that data measured from a section starting from a fifth point ending at a sixth point, wherein the fifth point is 5% away (a fifth distance 5% away) from the surface of the cathode active material layer facing away from the cathode current collector, and the sixth point is 5% away (a sixth distance 5% away) from the surface of the cathode current collector with respect to the total thickness of the cathode active material layer was used. For Comparative Example 2, measurement was not possible. For Comparative Example 3, measurement was performed in the same manner as in Example 1.

The first ratios of change, the second ratios of change, the first mean values, and the second mean values are represented in Table 1.

$$\text{Ratio of change of vertical relative force } (F_{VR}) = [(\text{Maximum value of vertical relative force} - \text{Minimum value of vertical relative force})/\text{Minimum value of vertical relative force}] \times 100 \quad \text{Equation 1}$$

TABLE 1

| | First change ratio [%] | Second change ratio [%] | First mean value | Second mean value |
|---|---|---|---|---|
| Comparative Example 1 | 1718 | — | 0.022 | — |

TABLE 1-continued

| | First change ratio [%] | Second change ratio [%] | First mean value | Second mean value |
|---|---|---|---|---|
| Comparative Example 3 | 390.2 | 440.8 | 0.028 | 0.022 |
| Example 1 | 98.2 | 82.5 | 0.032 | 0.023 |
| Example 2 | 120 | 119 | 0.031 | 0.021 |
| Example 3 | 129.8 | 110.3 | 0.029 | 0.020 |

As shown in Table 1, the ratio of change of vertical relative force of the first cathode active material layer and the second cathode active material layer included in the cathodes of Examples 1 to 3 were 200% or less, respectively.

Accordingly, it was found that regardless of the location along the thickness direction of the first cathode active material layer and the second cathode active material layer, the binding forces and compositional distributions were uniform.

Meanwhile, the change ratios of vertical relative force of the cathode active material layer included in the cathodes of Comparative Examples 1 and 3 were greater than 300%.

Accordingly, the cathode active material layer included in the cathodes of Comparative Examples 1 and 3 exhibited a significant difference in the binding force according to the thickness direction.

For the cathodes of Examples 1 to 3 and Comparative Example 3, the first cathode active material layer exhibited a greater mean binding force than that of the second cathode active material layer.

Evaluation Example 2: Evaluation of Horizontal Force of Cathode Active Material Layer (II)

Binding characteristics of the cathode active material layer included in the cathodes manufactured in Examples 1 to 8 and Comparative Examples 1 to 3 were analyzed using a SAICAS (SAICAS EN-EX, Daipla Wintes, JAPAN).

The horizontal force ($F_H$) according to depth was measured by performing constant velocity analysis using a diamond blade of a width of 1 mm in the conditions of a clearance angle of 10°, a rake angle of 20°, a shearing angle of 45°, a horizontal velocity of 4 μm/s, and a vertical velocity of 0.4 μm/s.

First constant velocity analysis was performed from a first position on the surface of the cathode active material layer, sequentially passing through the second cathode active material layer and the first cathode active material layer, to the surface of the cathode current collector, and the blade was moved horizontally along the surface of the cathode current collector to remove the cathode active material layer. Then, at a position 10 μm backward from the first position, second constant velocity analysis was performed in the same conditions as in the first constant velocity analysis. Data measured in the second constant velocity analysis was used.

In the case of Comparative Example 1, a first horizontal force ($F_{H1}$) at a first point (a fifth point), which is 10% away (a fifth distance 10% away) from the surface of the cathode active material layer, and a second horizontal force ($F_{H2}$) at a second point (a sixth point), which is 10% away (a sixth distance 10% away) from the surface of the cathode current collector with respect to the total thickness of the cathode active material layer were measured.

In the case of Examples 1 to 8 and Comparative Example 3, measured were: a first horizontal force ($F_{HA1}$) at a first point (a fifth point), which is 10% away (a fifth distance 10% away) from the surface of the second cathode active material layer facing away from the cathode current collector; and a second horizontal force ($F_{HA2}$) at a second point (a sixth point), which is 10% away (a sixth distance 10% away) from the surface of the cathode current collector with respect to the total thickness of the cathode active material layer comprising the first cathode active material layer and the second active material layer.

Some of the horizontal force evaluation results are represented in Table 2. A horizontal force ratio of the first point and second point is defined by Equation 2.

$$\text{Horizontal force ratio of first point and second point } (\%)=[F_{HA2}/F_{HA1}]\times 100 \qquad \text{Equation 2}$$

TABLE 2

| | Horizontal force ratio [%] |
|---|---|
| Comparative Example 1 | 45 |
| Example 1 | 73 |

As shown in Table 2, the horizontal force ratio of the first point (the fifth point) and the second point (the sixth point) for the cathode active material layer of Example 1 was remarkably higher than that for the cathode active material layer of Comparative Example 1.

Accordingly, it was confirmed that the binding strength between the cathode active material layer and the cathode current collector in the cathode of Example 1 was improved compared to that of Comparative Example 1.

For the cathode of Comparative Example 2, part of the cathode active material layer was delaminated from the cathode current collector before horizontal force evaluation, and thus, evaluation was impossible.

Evaluation Example 3: Evaluation of Surface Roughness of Cathode Current Collector A cross-section of the cathodes manufactured in Examples 1 to 8 and Comparative Example 1 was analyzed using a scanning electron microscope, and surface roughness of the cathode current collectors were measured from the cross-sections.

Some measurement results are represented in Table 3.

TABLE 3

| | $R_q$ [um] | $R_a$ [um] | $R_{max}$ [um] |
|---|---|---|---|
| Comparative Example 1 | greater than 2.5 | greater than 2.5 | greater than 4.0 |
| Example 1 | less than 1 | less than 1 | less than 1 |

Figure 5:
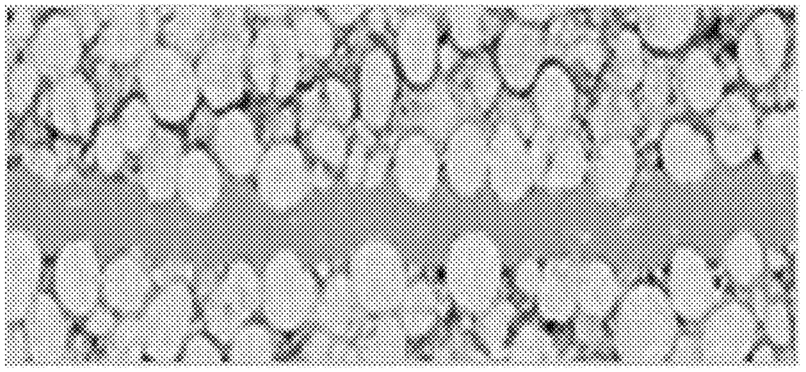
FIG. 5 is a scanning electron microscope image of a cross-section of a cathode manufactured according to Comparative Example 1.

As shown in Table 3 and FIG. 5, the surface of the cathode current collector in the wet cathode manufactured in Comparative Example 1 exhibited a $R_{max}$ greater than 4 um, a $R_a$ greater than 2.5 um, and a $R_q$ greater than 2.5 um.

For the wet cathode of Comparative Example 1, it was confirmed that cathode active material particles permeated into the cathode current collector, due to an increased press pressure, so that the surface of the cathode current collector was embossed.

Meanwhile, as shown in Table 3, the surface of the cathode current collector included in the cathode manufactured in Example 1 exhibited reduced surface roughness.

For the dry cathode of Example 1, it was confirmed that cathode active material particles did not permeate into the cathode current collector, due to a reduced press pressure, and thus, the surface of the cathode current collector was almost not embossed (substantially not embossed).

For the dry cathode of Example 1, despite the use of the thin film current collector, cracks or the like were not found in the thin film current collector.

Evaluation Example 4: Peel Strength Evaluation

The cross-section of each of the cathodes manufactured in Examples 1 to 8 and Comparative Example 1 was cut to a size of 25 mm×150 mm, which was then fixed to a center portion of a slide glass of 30 mm×200 mm with a double-side tape. Then, while the current collector was peeled off from the cathode active material layer using a universal testing machine (UTM, Instron), a 90-degree peel strength was measured. Some of the measurement results are shown in Table 4.

TABLE 4

| | Peel strength [gf/mm] |
|---|---|
| Comparative Example 1 | 2.5 |
| Example 1 | 1 |

As shown in Table 4, the cathode of Example 1 exhibited a binding strength of 1 gf/mm. Accordingly, the cathode of Example 1 appeared to have high binding strength, despite the surface of the cathode current collector having low surface roughness as shown in Evaluation Example 3.

Although the cathode of Comparative Example 1 also appeared to have excellent binding strength, this binding strength of the cathode active material was due to the cathode current collector surface having high surface roughness.

The cathode of Comparative Example 2 could not be evaluated because part of the cathode active material layer was peeled off from the cathode current collector before the peel strength evaluation.

Evaluation Example 5: Room Temperature Charge/Discharge Characteristic Evaluation The lithium batteries manufactured in Examples 1 to 8 and Comparative Examples 1 to 3 were charged with a constant current of 0.1 C rate at 25° C. until a voltage reached 4.4 V (vs. Li), and maintained at 4.4 V in a constant voltage mode and then cut off at a current of 0.05 C rate. Subsequently, during discharging, the lithium batteries were discharged with a constant current of 0.1 C rate until the voltage reached 2.8 V (vs. Li) (formation cycle).

The lithium batteries, which had undergone the formation cycle, were charged with a constant current of 0.5 C rate at 25° C. until the voltage reached 4.4 V (vs. Li). Subsequently, during discharging, the lithium batteries were discharged with a constant current of 0.5 C rate until the voltage reached 2.8 V (vs. Li). This cycle was repeated in the same conditions up to the 100th cycle (repeated 100 times).

Through all of the charge/discharge cycles, there was a pause of 10 minutes after each charge/discharge cycle. Some results of the room temperature charge/discharge test are shown in Table 5. The capacity retention ratio at the 100th cycle is defined by Equation 3.

Capacity retention ratio [%]=[Discharge capacity at $100^{th}$ cycle/Discharge capacity at $1^{st}$ cycle]×100 Equation 1

TABLE 5

| | Capacity retention ratio [%] |
|---|---|
| Example 1 | 91.3 |
| Example 2 | 90.5 |
| Example 3 | 90.1 |
| Example 4 | 93.5 |
| Example 5 | 94.2 |
| Example 6 | 92.9 |
| Example 7 | 92.0 |
| Example 8 | 89.2 |
| Comparative Example 1 | 72.5 |
| Comparative Example 3 | 80.1 |

As shown in Table 5, the lithium batteries of Examples 1 to 8 had improved room-temperature lifespan characteristics compared to the lithium batteries of Comparative Examples 1 and 3.

Accordingly, the lithium batteries of Examples 4 to 6 exhibited improved lifespan characteristics compared to the lithium battery of Example 1, and also exhibited improved lifespan characteristics compared to that of Example 7.

The lithium battery of Comparative Example 3 was considered to exhibit poor lifespan characteristics due to an increased difference in the binding strength of the binder according to positions in the thickness direction of the cathode active material layer.

According to one aspect of embodiments, because an electrode has uniform (e.g., substantially uniform) distribution of components, cycle characteristics of a lithium battery including the electrode are improved.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by those of ordinary skill in the art that various changes in form and details may be made therein without departing from the spirit and scope of the disclosure as defined by the following claims, and equivalents thereof.

What is claimed is:

1. An electrode comprising:

an electrode active material layer comprising an electrode active material and a binder;

an electrode current collector on one surface or between two surfaces of the electrode active material layer; and an interlayer between the electrode active material layer and the electrode current collector, wherein the electrode active material layer comprises: a first electrode active material layer comprising a first electrode active material and contacting the interlayer; and a second electrode active material layer arranged on the first electrode active material layer and including a second electrode active material, wherein the first electrode active material layer has, as measured by a surface and interfacial cutting analysis system (SAICAS), a first ratio of change of vertical relative force ($F_{VR}$) between a first point, which is 5% away from a surface of the first electrode active material layer facing away from the electrode current collector, and a second point, which is 5% away from a surface of the first electrode active material layer facing the electrode current collector with respect to a total thickness of the first electrode active material layer, the second electrode active material layer has, as measured by the SAICAS, a second ratio of change of vertical relative force ($F_{VR}$) between a third point, which is 5% away from a surface of the second electrode active material layer facing away from the first electrode active material layer, and a fourth point, which is 5% away from a surface of the second electrode active material layer facing the first electrode active material layer with respect to a total thickness of the second electrode active material layer, the first electrode active material is dry-mixed without a solvent, the second electrode active material is dry-mixed without a solvent, a thickness of the interlayer is about 10 nm to about 1.5 um and a thickness of the electrode current collector is 14 μm or less, the first ratio of change of the first electrode active material layer is 300% or less, the second ratio of change of the second electrode active material layer is 300% or less, and the first ratio of change of vertical relative force ($F_{VR}$) and the second ratio of change of vertical relative force are calculated by Equation 1 ratio of change ratio of vertical relative force ($F_{VR}$)=[(Maximum value of vertical relative force−Minimum value of vertical relative force)/Minimum value of vertical relative force]×100. Equation 1

2. The electrode of claim 1, wherein the first electrode active material layer has, as measured by the SAICAS, a first mean value of vertical relative force ($F_{VR}$) between the first point, which is 5% away from the surface of the first electrode active material layer facing away from the electrode current collector, and the second point, which is 5% away from the surface of the first electrode active material layer facing the electrode current collector with respect to the total thickness of the first electrode active material layer, the second electrode active material layer has, as measured by the SAICAS, a second mean value of vertical relative force ($F_{VR}$) between the third point, which is 5% away from the surface of the second electrode active material layer facing away from the first electrode active material layer, and the fourth point, which is 5% away from the surface of the second electrode active material layer facing the first electrode active material layer with respect to the total thickness of the second electrode active material layer, and the first mean value of the first electrode active material layer is greater than the second mean value of the second electrode active material layer.

3. The electrode of claim 2, further comprising a third electrode active material layer between the first electrode active material layer and the second electrode active material layer, wherein the third electrode active material layer has, as measured by the SAICAS, a third mean value of vertical relative force ($F_{VR}$) between a point, which is 5% away from a surface of the third electrode active material layer facing away from the first electrode active material layer, and a point, which is 5% away from a surface of the third electrode active material layer facing the first electrode active material layer with respect to the total thickness of the third electrode active material layer, and the third mean value is greater than the first mean value, or the third mean value is greater than the second mean value and smaller than the first mean value.

4. The electrode of claim 1, wherein a porosity of the first electrode active material layer is smaller than that of the second electrode active material layer.

5. The electrode of claim 1, further comprising a third electrode active material layer between the first electrode active material layer and the second electrode active material layer, wherein a porosity of the third electrode active material layer is smaller than that of the first electrode active material layer, or wherein a porosity of the third electrode active material layer is greater than that of the first electrode active material layer and smaller than that of the second electrode active material layer.

6. The electrode of claim 1, wherein the electrode current collector has a form selected from a sheet, a foil, a film, a plate, a porous body, a mesoporous body, a through-hole-containing body, a polygonal ring body, a mesh body, a foam, and a non-woven body.

7. The electrode of claim 1, wherein the binder is a dry binder, the dry binder comprises a fibrillized binder, and the dry binder comprises a fluorine-based binder, the electrode active material layer is a self-standing film, and the electrode active material layer is free of a residual process solvent.

8. The electrode of claim 1, wherein the electrode active material layer further comprises a conductive material, the conductive material is a dry conductive material, and the dry conductive material comprises a carbonaceous conductive material.

9. The electrode of claim 1, wherein the interlayer is directly on one surface or two surfaces of the electrode current collector, the interlayer comprises a carbonaceous conductive material, the interlayer further comprises a binder, and the binder comprises a fluorine-based binder.

10. The electrode of claim 1, wherein one or more of the first electrode active material and the second electrode active material is a composite cathode active material, the composite cathode active material comprises: a core including a lithium transition metal oxide; and a shell provided along a surface of the core, the shell comprises: one or more first metal oxides represented by the formula of $M_aO_b$ (wherein $0<a\leq3$, $0<b<4$, and b is not an integer when a is 1, 2, or 3); and graphene, and the one or more first metal oxides are in a graphene matrix, and M is at least one metal selected from Groups 2 to 13, 15 and 16 of the periodic table of the elements.

11. The electrode of claim 1, wherein the electrode active material layer includes: a first surface; a second surface that is opposite to the first surface;

a first side surface coupled to lengthwise ends of the first surface and the second surface; a second side surface that is opposite to the first side surface;

a third side surface coupled to widthwise ends of the first surface and the second surface; and a fourth side surface that is opposite to the third side surface, the electrode active material layer has a first area defined by a first lengthwise distance and a first widthwise distance thereof, the electrode current collector is between the first surface and the second surface, the electrode current collector has a second area defined by a second lengthwise distance and a second widthwise distance thereof, and the second area of the electrode current collector is less than 100% of the first area of the electrode active material layer.

12. The electrode of claim 11, wherein the second lengthwise distance of the electrode current collector is less than 100% of the first lengthwise distance of the electrode active material layer, or the second widthwise distance of the electrode current collector is less than 100% of the first widthwise distance of the electrode active material layer, or the second lengthwise distance of the electrode current collector is less than 100% of the first lengthwise distance of the electrode active material layer, and the second widthwise distance of the electrode current collector is less than 100% of the first widthwise distance of the electrode active material layer.

13. The electrode of claim 11, wherein the electrode current collector is exposed through three or fewer side surfaces selected from among the first side surface, the second side surface, the third side surface, and the fourth side surface, and the electrode current collector further comprises a tab extending to the outside of the electrode active material layer through two or fewer side surfaces selected from the first side surface, the second side surface, the third side surface, and the fourth side surface.

14. The electrode of claim 11, comprising a plurality of electrode current collectors arranged spaced apart along a length direction or width direction of the electrode active material layer, and the plurality of electrode current collectors are arranged to form an angle of 45 degrees or less with one or more of the first surface and the second surface of the electrode active material layer.

15. The electrode of claim 11, wherein the electrode active material layer includes:

a first region which is between the first surface and the second surface and in which the electrode current collector is located; and a second region which is between the first surface and the second surface and is free of the electrode current collector, and a mixture density of the second region is less than 100% of that of the first region.

16. A lithium battery comprising:

a cathode; an anode; and an electrolyte between the cathode and the anode, wherein one or more of the cathode and the anode is the electrode according to claim 1.

17. The lithium battery of claim 16, wherein the lithium battery is selected from a lithium-ion battery and a lithium solid battery.

18. The lithium battery of claim 16, comprising an electrode assembly including:

a plurality of cathodes stacked along a thickness direction of the lithium battery;

a plurality of anodes each between the plurality of cathodes; and a plurality of electrolytes each located between the plurality of cathodes and the plurality of anodes, wherein:

the cathode comprises a cathode current collector, and the cathode current collector comprises a cathode tab extending to the outside of a cathode active material layer through one side surface of the electrode assembly, and the anode comprises an anode current collector, and the anode current collector comprises an anode tab extending to the outside of an anode active material layer through the one side surface, or through another side surface that is opposite to the one side surface, of the electrode assembly.

19. A method of manufacturing an electrode, the method comprising:

preparing at least two mixtures by dry-mixing an electrode active material, a dry conductive material, and a dry binder;

providing an electrode current collector having an interlayer on one surface or two surfaces thereof; and simultaneously or sequentially providing and then pressing the at least two mixtures on one surface or two surfaces of the electrode current collector to thereby manufacture an electrode having an electrode active material layer on the one or two surfaces of the electrode current collector, wherein the electrode active material layer comprises a first electrode active material layer comprising a first electrode active material, and a second electrode active material layer comprising a second electrode active material, wherein the first electrode active material layer has, as measured by a surface and interfacial cutting analysis system (SAICAS), a first ratio of change of vertical relative force ($F_{VR}$) between a first point, which is 5% away from a surface of the first electrode active material layer facing away from the electrode current collector, and a second point, which is 5% away from a surface of the first electrode active material layer facing the electrode current collector with respect to a total thickness of the first electrode active material layer, the second electrode active material layer has, as measured by the SAICAS, a second ratio of change of vertical relative force ($F_{VR}$) between a third point, which is 5% away from a surface of the second electrode active material layer facing away from the first electrode active material layer, and a fourth point, which is 5% away from a surface of the second electrode active material layer facing the first electrode active material layer with respect to the total thickness of the second electrode active material layer, a thickness of the interlayer is about 10 nm to about 1.5 um and a thickness of the electrode current collector is 14 μm or less, the first ratio of change of the first electrode active material layer is 300% or less, the second ratio of change of the second electrode active material layer is 300% or less, and the first ratio of change of vertical relative force ($F_{VR}$) and the second ratio of change of vertical relative force are calculated by Equation 1

$$\text{ratio of change ratio of vertical relative force } (F_{VR}) = [(\text{Maximum value of vertical relative force} - \text{Minimum value of vertical relative force})/\text{Minimum value of vertical relative force}] \times 100. \quad \text{Equation 1}$$

* * * * *